(12) United States Patent
Zhu et al.

(10) Patent No.: US 11,214,659 B2
(45) Date of Patent: Jan. 4, 2022

(54) POLYMER BLENDS AND ARTICLES MADE THEREFROM

(71) Applicant: ExxonMobil Chemical Patents Inc., Baytown, TX (US)

(72) Inventors: Zhenyu Zhu, Shanghai (CN); Jianya Cheng, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/423,042

(22) PCT Filed: Sep. 30, 2013

(86) PCT No.: PCT/US2013/062589
§ 371 (c)(1),
(2) Date: Feb. 20, 2015

(87) PCT Pub. No.: WO2014/065989
PCT Pub. Date: May 1, 2014

(65) Prior Publication Data
US 2015/0225521 A1    Aug. 13, 2015

Related U.S. Application Data

(60) Provisional application No. 61/718,861, filed on Oct. 26, 2012.

(51) Int. Cl.
*C08L 23/08* (2006.01)
*C08J 5/18* (2006.01)

(52) U.S. Cl.
CPC ............. *C08J 5/18* (2013.01); *C08L 23/0815* (2013.01); *C08J 2323/06* (2013.01); *C08J 2323/08* (2013.01); *C08J 2423/06* (2013.01); *C08J 2423/08* (2013.01); *C08L 2203/16* (2013.01); *C08L 2205/025* (2013.01); *C08L 2207/07* (2013.01)

(58) Field of Classification Search
CPC .................................................. C08L 23/0815
See application file for complete search history.

(56) References Cited

U.S. PATENT DOCUMENTS

| | | | |
|---|---|---|---|
| 3,248,179 A | 4/1966 | Norwood | |
| 4,543,399 A | 9/1985 | Jenkins, III et al. | |
| 4,588,790 A | 5/1986 | Jenkins, III et al. | |
| 4,613,484 A | 9/1986 | Ayres et al. | |
| 4,989,802 A * | 2/1991 | Akao | B29C 45/00 242/610.6 |
| 5,008,204 A | 4/1991 | Stehling | |
| 5,028,670 A | 7/1991 | Chinh et al. | |
| 5,272,236 A * | 12/1993 | Lai | B32B 27/08 526/348.5 |
| 5,317,036 A | 5/1994 | Brady, III et al. | |
| 5,352,749 A | 10/1994 | DeChellis et al. | |
| 5,378,764 A * | 1/1995 | Benham | C08L 23/06 525/240 |
| 5,382,631 A | 1/1995 | Stehling et al. | |
| 5,405,922 A | 4/1995 | DeChellis et al. | |
| 5,436,304 A | 7/1995 | Griffin et al. | |
| 5,453,471 A | 9/1995 | Bernier et al. | |
| 5,462,999 A | 10/1995 | Griffin et al. | |
| 5,616,661 A | 4/1997 | Eisinger et al. | |
| 5,627,242 A | 5/1997 | Jacobsen et al. | |
| 5,665,818 A | 9/1997 | Tilston et al. | |
| 5,668,228 A | 9/1997 | Chinh et al. | |
| 5,677,375 A | 10/1997 | Rifi et al. | |
| 6,242,545 B1 | 6/2001 | Jejelowo et al. | |
| 6,248,845 B1 | 6/2001 | Loveday et al. | |
| 6,316,549 B1 * | 11/2001 | Chum | B32B 27/08 525/240 |
| 6,423,420 B1 | 7/2002 | Brant et al. | |
| 6,956,088 B2 | 10/2005 | Farley et al. | |
| 2003/0096128 A1 * | 5/2003 | Farley | C08J 5/18 428/500 |
| 2008/0038533 A1 | 2/2008 | Best et al. | |
| 2009/0192270 A1 * | 7/2009 | Malakoff | C08L 23/0815 525/240 |
| 2010/0002987 A1 | 1/2010 | Hata et al. | |
| 2010/0113718 A1 | 5/2010 | Mehta et al. | |
| 2011/0318560 A1 * | 12/2011 | Yun | B32B 7/02 428/220 |
| 2013/0065035 A1 * | 3/2013 | Van Loon | C08L 23/0815 428/220 |
| 2013/0224463 A1 | 8/2013 | Shirodkar et al. | |
| 2016/0017133 A1 * | 1/2016 | Chen | C08L 23/12 525/227 |
| 2016/0064030 A1 | 3/2016 | Smits | |

FOREIGN PATENT DOCUMENTS

| | | |
|---|---|---|
| EP | 634421 | 1/1995 |
| EP | 802202 | 10/1997 |
| EP | 794200 | 4/1998 |
| WO | 93/003093 | 2/1993 |
| WO | 96/008520 | 3/1996 |
| WO | 98/21276 A | 5/1998 |
| WO | 98/26000 A | 6/1998 |
| WO | 02/004556 | 1/2002 |
| WO | WO2012/112259 | 8/2012 |

OTHER PUBLICATIONS

Enable 20-05 flyer, 2017.*
Exxon LLDPE LL1001 flyer, 2011.*
Macromolecules, vol. 34, No. 19, p. 6812 (2001).
Wild, et al., J. Poly. Sci., Poly. Phys. Ed., vol. 20, p. 441 (1982).
Randall, James C., (1989) A Review of High Resolution Liquid 13Carbon Nuclear Magnetic Resonance Characterizations of Ethylene-Based Polymers, Journal of Macromolecular Science, Reviews in Macromolecular Chemistry and Physics, 29:2-3, 201-317, DOI: 10.1080/07366578908055172.

* cited by examiner

*Primary Examiner* — Irina Krylova
(74) *Attorney, Agent, or Firm* — ExxonMobil Chemical Patents Inc.-Law Department

(57) ABSTRACT

Polymer compositions including (A) 15.0 to 90.0 wt % of a heterogeneously branched ethylene polymer having polymer units derived from at least one $C_3$-$C_{20}$ alpha-olefin and having a CBDI<50.0%; and (B) 85.0 to 10.0 wt. % of an ethylene-based polymer and films made therefrom are disclosed.

28 Claims, 11 Drawing Sheets

POLYMER BLENDS AND ARTICLES MADE THEREFROM

CROSS-REFERENCE TO RELATED APPLICATIONS

Figure 1:
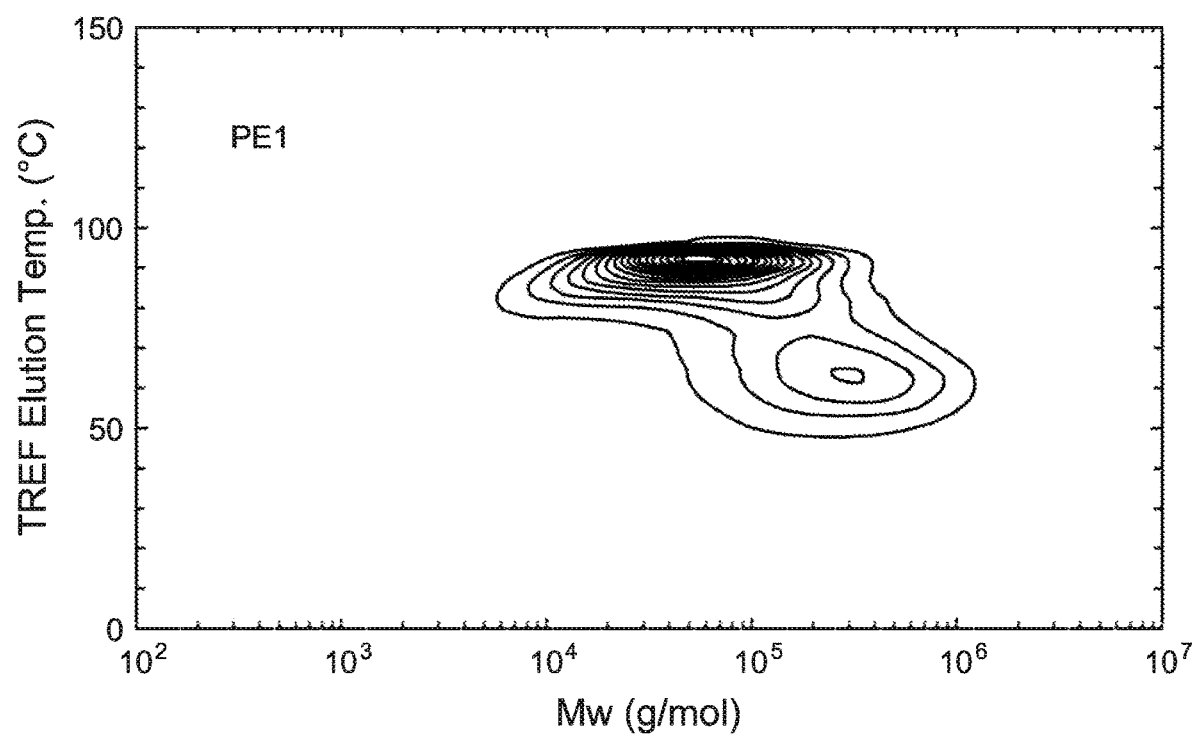

This application is a National Stage Application of International Application No. PCT/US2013/062589, filed Sep. 30, 2013, and claims the benefit of Ser. No. 61/718,861, filed Oct. 26, 2012, the disclosures of which are hereby incorporated by reference in their entireties.

FIELD OF THE INVENTION

The present invention is directed to blends, methods for making the same, and articles made therefrom. In particular, provided are blends of heterogeneously branched ethylene polymers with ethylene-based polymers.

BACKGROUND OF TILE INVENTION

Linear low density polyethylenes, and blends and articles made therefrom, are generally known in the art. One class of polymers useful on its own and in blends is linear low density polyethylene produced using a Ziegler-Natta catalyst in a gas phase process.

While such gas-phase Ziegler-Natta polyethylenes are sometimes preferred because they provide relatively low-cost solutions to a number of needs, their properties render them less desirable than more costly premium polyethylenes for a number of applications. For example, while such polymers can exhibit good tear resistance, the Dart impact performance of gas-phase Zeigler Natta polyethylenes is relatively poor compared to other polyethylenes.

Thus, blending of lower-cost Ziegler-Natta polyethylenes with other polymers to obtain an improved balance of properties, e.g., tear resistance and Dart Impact, has been an area of on-going and intense effort. The improvement of a particular property of a relatively poor performing polymer upon blending with another component, however, is generally related to the amount of the better performing component added to the blend. Conversely, the performance of the blend is generally expected to be worse than that of the premium product alone. This is referred to as the "mixing rule" or "blend rule" where blend property is the fractional weighted average of the property of the component polymers of the polymer blend. While the linear relationship predicted by the blend rule is not always followed, it is generally expected that blend property values will be less than that predicted by the linear relationship predicted by the blend rule. Values higher than predicted by the blend rule or are unaffected by significant amounts of a blend component indicate an unexpected synergy in the interaction of the blend components.

SUMMARY OF THE INVENTION

In one aspect, embodiments of the invention provide a polymer composition comprising: (A) 5.0 to 95.0 wt. % of a heterogeneously branched ethylene polymer having polymer units derived from at least one $C_3$-$C_{20}$ alpha-olefin and having a CBDI<50.0%; and (B) 95.0 to 5.0 mole % of an ethylene-based polymer, wherein the composition has a MD Elmendorf Tear value greater than the MD Elmendorf Tear value for the polymer composition on the line connecting the individual MD Elmendorf Tear values of the heterogeneously branched polymer and the ethylene-based polymer.

Such compositions can be used to make a variety of articles. Exemplary articles include monolayer and multilayer blown, extruded, and/or cast stretch and/or shrink films; wire and cable coating compositions; articles formed by injection molding, rotational molding, blow molding, extrusion coating, and/or casting; and combinations thereof.

Thus, in another aspect, embodiments of the invention provide a polymer film comprising at least one layer, said at least one layer comprising: (A) 5.0 to 95.0 wt. % of a heterogeneously branched ethylene polymer having polymer units derived from at least one $C_3$-$C_{20}$ alpha-olefin and having a SCBDI of less than 50.0%; and (B) 95.0 to 5.0 mole % of an ethylene-based polymer having at least a first peak and a second peak in a cornonomer distribution analysis, wherein the first peak has a maximum at a log(Mw) value of 4.0 to 5.4 and a TREF elution temperature of 70.0° C. to 100.0° C. and the second peak has a maximum at a log(Mw) value of 5.0 to 6.0 and a TREF elution temperature of 40.0° C. to 60.0° C.

DETAILED DESCRIPTION OF THE INVENTION

In the following description, all members disclosed herein are approximate values, regardless whether the word "about" or "approximate" is used in connection therewith. They may vary by 1%, 2%, 5%, and sometimes, 10 to 20%. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1% to 100% with a 1% increment, i.e., k is 1%, 2%, 3%, 4%, 5%, ..., 50%, 51%, 52%, ..., 95%, 96%, 97%, 98%, 99%, or 100%. Moreover, any numerical range defined by two R numbers as defined in the above is also specifically disclosed.

Molecular weight distribution ("MWD") is equivalent to the expression $M_w/M_n$. The expression $M_w/M_n$ is the ratio of the weight average molecular weight ($M_w$) to the number average molecular weight ($M_n$). The weight average molecular weight is given by:

$$M_w = \frac{\sum_i n_i M_i^2}{\sum_i n_i M_i}$$

The number average molecular weight is given by $$M_n = \frac{\sum_i n_i M_i}{\sum_i n_i}$$

The z-average molecular weight is given by $$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are typically determined by Gel Permeation Chromatography as disclosed in Macromolecules, Vol. 34, No. 19, p. 6812 (2001).

Composition distribution breadth index ("CDBI") is defined as the weight percentage of the copolymer molecules having a comonomer content within 50% of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci. Poly. Phys. Ed.*, Vol. 20, p. 441 (1982) and U.S. Pat. No. 5,008,204, which are fully incorporated herein by reference.

Solubility distribution breadth index ("SDBI") is used as a measure of the breadth of the solubility distribution curve for a given polymer. The procedure used herein for calculating SDBI is as described in PCT Patent Application WO 93/03093, pp. 16-18, published Feb. 18, 1993.

Both CDBI and SDBI may be determined using data obtained via CRYSTAF. In such cases, a commercial CRYSTAF model 200 instrument (PolymerChar S.A.) is used for chemical composition distribution (CCD) analysis. Approximately 20 to 30 mg of polymer is placed into each reactor and dissolved in 30 mL of 1,2 dichlorobenzene at 160° C. for approximately 60 minutes, then allowed to equilibrate for approximately 45 minutes at 100° C. The polymer solution is then cooled to either 30° C. (standard procedure) or 0° C. (cryo procedure) using a cooling rate of 0.2° C./min. A two wavelength infrared detector is then used to measure the polymer concentration during crystallization (3.5 µm, 2853 cm$^{-1}$ sym. stretch) and to compensate for base line drifts (3.6 µm) during the analysis time. The solution concentration is monitored at certain temperature intervals, yielding a cumulative concentration curve. The derivative of this curve with respect to temperature represents the weight fraction of crystallized polymer at each temperature. In both standard and cryo procedures, any resin in solution below the temperature to which the solution is cooled is defined as "% solubles." The cryo procedure outlined above, i.e., cooling to 0° C., typically provides greater detail, especially for amorphous samples that tend to stay in solution at or around 30° C.

Heterogeneously Branched Ethylene Polymer

The term "heterogeneously branched ethylene polymer" refers to an polymer having polymer units derived from ethylene and preferably at least one $C_3$-$C_{20}$ alpha-olefin and having a CBDI<50.0%. Typically such polymers are the result of a Ziegler polymerization process. Such polymers are also referred to as LLDPEs, more particularly sometimes as ZN LLDPEs.

Heterogeneously branched ethylene polymers differ from the homogeneously branched ethylene polymers primarily in their branching distribution. For example, heterogeneously branched LLDPE polymers have a distribution of branching, including a highly branched portion (similar to a very low density polyethylene), a medium branched portion (similar to a medium branched polyethylene) and an essentially linear portion (similar to linear homopolymer polyethylene). The amount of each of these fractions varies depending upon the whole polymer properties desired. For example, linear homopolymer polyethylene has neither branched nor highly branched fractions, but is linear.

Heterogeneously branched ethylene polymers have lower amounts of the highly branched fraction, but have a greater amount of the medium branched fraction. While ATREF will show homogeneously branched ethylene polymers typically are characterized by a single relatively narrow peak at some elution temperature, some heterogeneously branched ethylene polymers have a broad branching distribution, as represented by the breadth of elution temperatures over which the polymer fractions elute. Such polymers may also have a distinct peak at an elution temperature characteristic of a "linear", "high density" or "crystalline" polymer fraction.

Embodiments of the polymer compositions preferably comprise 5.0 to 95.0 wt. % of the heterogeneously branched ethylene polymer. Some embodiments have an upper limit on heterogeneously branched ethylene polymer content of 85.0 wt. %, 80.0 wt. %, 75.0 wt. %, 70.0 wt. %, 65.0 wt. %, 60.0 wt. %, 55.0 wt. %, 50.0 wt. %, 45.0 wt. %, 40.0 wt. %, 35.0 wt %, 30.0 wt. %, 25.0 wt. %, 20.0 wt. %, 17.5 wt. %, 15.0 wt. %, 10.0 wt. %, or 7.5 wt. %. The lower limit on heterogeneously branched ethylene polymer content can be 5.0 wt. %, 7.5 wt. %, 10.0 wt. %, 15.0 wt. %, 17.5 wt. %, 20.0 wt. %, 25.0 wt. %, 30.0 wt. %, 35.0 wt. %, 40.0 wt. %, 45.0 wt. %, 50.0 wt. %, 55.0 wt. %, 60.0 wt. %, 65.0 wt. %, 70.0 wt. %, 75.0 wt. %, 80.0 wt. %, 85.0 wt. %, 90.0 wt. %, 92.5 wt. %, or 95.0 wt. %. While embodiments include those of any combination of upper and lower limits, particular embodiments can have, for example, 10.0 to 90.0 wt. %, 15.0 to 85.0 wt. %, 15.0 to 75.0 wt. %, 15.0 to 50.0 wt. %, 15.0 to 45.0 wt. %, 15.0 to 30.0 wt. %, 15.0 to 25.0 wt. %, 15.5 to 22.5 wt. %, 20.0 to 40.0 wt. %, or 20.0 to 30.0 wt. % of the heterogeneously branched ethylene polymer. Unless otherwise indicated, all Weight fractions described herein are based on the total weight of the polymer composition.

Heterogeneously branched ethylene polymer typically has a CBDI<50.0%; preferably <45.0%, <40.0%, <35.0%, <30.0%, <25.0%, or <20.0%. In particular embodiments the CBDI of the heterogeneously branched ethylene polymer is 20.0 to <50.0%, 20.0 to 45.0%, 20.0 to 35.0%, 20.0 to 30.0%, 20.0 to 25.0%, 25.0 to 30.0%, 25.0 to 35.0%, 25.0 to 40.0%, 25.0 to 45.0%, 30.0 to 35.0%, 30.0 to 40.0%, 30.0 to 45.0%, 30.0 to <50.0%, 35.0 to 40.0%, 35.0 to 40.0%, 35.0 to 45.0%, 35.0 to <50.0%, 40.0 to 45.0%, or 40.0 to <50.0%.

The heterogeneously branched ethylene polymer typically comprises 80 to 100 mole % of polymer units derived from ethylene and 0 to 20.0 mole % of polymer units derived from at least one $C_3$-$C_{20}$ alpha-olefin, preferably the alpha olefin has 4 to 8 carbon atoms. The upper limit on the mole fraction of polymer units derived from ethylene in the heterogeneously branched ethylene polymer can be 99.5 mole %, 99.0 mole %, 97.0 mole %, 95.0 mole %, 92.5.0 mole %, 90.0 mole %, 87.5 mole %, 85.0 mole %, 82.5 mole %, or 80.0 mole %. The lower limit can be 80.0 mole %, 82.5 mole %, 85.0 mole %, 87.5 mole %, 90.0 mole %, 95.0 mole %, 97.0 mole %, 99.0 mole %, or 99.5 mole %. The mole fraction of ethylene derived units in the heterogeneously branched ethylene polymer may, in some embodiments, be 80.0 to 99.0 mole %, 80.0 to 97.0 mole %, 80.0 to 95.0 mole %, 82.5 to 92.5 mole %, or 85.0 to 90.0 mole %. The content of comonomer is determined based on the mole fraction based on the content of all monomers in the polymer.

The content of polymer units derived from alpha-olefin in the heterogeneously branched ethylene polymer may be any amount consistent with the above ranges for ethylene, Some preferred amounts are 2.0 to 20.0 mole %, 2.0 to 15.0 mole %, or 5.0 to 10.0 mole %, particularly where the polymer units are derived from one or more $C_4$-$C_8$ alpha-olefins, more particularly butene-1, hexene-1, or octene-1.

Heterogeneously branched ethylene polymer has a density≤0.950 g/cm$^3$, preferably ≤0.940 g/cm$^3$ particularly from 0.915 to about 0.950 g/cm$^3$, preferably 0.920 to 0.940 g/cm$^3$.

The melt index, $I_{2.16}$, according to ASTM D-1238-E (190° C./2.16 kg) of the heterogeneously branched ethylene polymer is generally from about 0.1 g/10 min, to about 100.0 g/10 min. While the upper limit on the range of the melt index may be 100.0 g/10 min., 90.0 g/10 min., 80.0 g/10 min., 70.0 g/10 min., 60.0 g/10 min., 50.0 g/10 min., 40.0 g/10 min., 30.0 g/10 min., 25.0 g/10 min., 20.0 g/10 min., 15.0 g/10 min., 10.0 g/10 min., 5.0 g/10 min., 2.5 g/10 min., 2.0 g/10 min., or 1.0 g/10 min.; and the lower limit may be 0.1 g/10 min., 0.2 g/10 min., 0.3 g/10 min., 0.5 g/10 min., 1.0 g/10 min., 2.0 g/10 min., 2.5 g/10 min., 5.0 g/10 min., 10.0 g/10 min., 15.0 g/10 min., 20.0 g/10 min., 25.0 g/1.0 min., 30.0 g/10 min., 40.0 g/10 min., 50.0 g/10 min., 60.0 g/10 min., 70.0 g/10 min., 80.0 g/10 min., 90.0 g/10 min., or 95.0 g/10 min., preferred melt indexes are 0.50 to 60.0 g/10 min., more preferably 0.50 to 5.0 g/1.0 min.

Particular heterogeneously branched ethylene polymers have a density of 0.915 g/cc to 0.945 g/cm³, preferably 0.920 to 0.940 g/cm³, and a melt index of 0.50 to 60.0 g/10 preferably 0.50 to 5.0 g/10 min. Preferably the CBDI of such polymers is 20.0 to 50.0%, 25.0 to 45.0%, 30.0 to 40.0%, or 35.0 to 40.0%.

Heterogeneously branched ethylene polymers are typically characterized by a relatively broad molecular weight distribution (Mw/Mn), e.g., greater than 3.0, preferably at least 3.2, and more preferably at least 3.3.

Some heterogeneously branched ethylene polymers used herein also have at least two melting points, as determined using Differential Scanning calorimetry (DSC) between the temperature range of −30° C. to 150° C.

Suitable heterogeneously branched ethyl polymers are LLDPE grades available from ExxonMobil Chemical Company, e.g., LLDPE LL 1001 Series ethylene/butene-1 polymers having melt index of 1.0 g/10 min. and a density of 0.918 g/cm³; LLDPE LL 1002, Series ethylene/butene-1 polymers having a melt index of 2.0 g/10 min and a density of 0.918 g/cm³, LLDPE LL 1107 Series ethylene/butene-1 polymers having a melt index of 0.80 g/10 min and a density of 0.922 g/cm³; LLDPE LL 1236 Series polymers having a melt index of 3.6 g/10 min. and a density of 0.925 g/cm³; LLDPE LL 3001 Series ethylene/hexene-1 polymers having a melt index of 1.0 g/10 min. and a density of 0.917 g/cm³; LLDPE LL 3003 Series ethylene:/hexene-1 polymers having a melt index of 3.2 g/10 min. and a density of 0.918 g/cm³; LLDPE LL 3201 Series ethylene/hexene-1 polymers having a. melt index of 0.80 g/10 min. and a density of 0.926 g/cm³; LLDPE L I. 3204 Series ethylene/hexene-1 polymers having a melt index of 2.0 g/10 min. and a density of 0.942 g/cm³; LLDPE LL 5002 Series polymers having a melt index of 2.0 g/10 min. and a density of 0.918 g/cm³; LLDPE LL 5100 Series polymers having a melt index of 20.0 g/10 min. and a density of 0.925 g/cm³; LLDPE LL 5252 Series polymers having a melt index of 52.0 g/10 min. and a density of 0.926 g/cm³; LLDPE LL 6100 Series ethylene/butene-1 polymers having a melt index of 20.0 g/10 min. and a density of 0.925 g/cm³; LLDPE LL 6201 Series ethyiene/butene-1 polymers having a melt index of 50.0 g/10 min. and a density of 0.926 g/cm³; LLDPE LL 6202 Series ethylene/butene-1 polymers having a melt index of 12.0 g/10 min. and a density of 0.926 g/cm³.

Ethylene-Based Polymer

Embodiments of the polymer compositions preferably comprise 5.0 to 95.0 wt % of the ethylene-based polymer. Some embodiments have an upper limit on ethylene-based polymer content of 85.0 wt. %, 80.0 wt. %, 75.0 wt. %, 70.0 wt. %, 65.0 wt. %, 60.0 wt. %, 55.0 wt. %, 50.0 wt. %, 45.0 wt. %, 40.0 wt. %, 35.0 wt %, 30.0 wt %, 25.0 wt. %, 20.0 wt %, 17.5 wt %, 15.0 wt. % 10.0 wt. % or 7.5 wt %. The lower limit on the ethylene-based polymer content can be 5.0 wt. %, 7.5 wt. % 10.0 wt. %, 15.0 wt %, 17.5 wt. %, 20.0 wt %, 25.0 wt. %, 30.0 wt. %, 35.0 wt. %, 40.0 wt %, 45.0 wt. %, 50.0 wt. %, 55.0 wt. %, 60.0 wt. %, 65.0 wt. %, 70.0 wt. %, 75.0 wt. %, 80.0 Wt. %, 85.0 wt. %, 90.0 wt. %, 92.5 wt. % or 95.0 wt. %. While embodiments include those of any combination of upper and lower limits, particular embodiments can have for example 10.0 to 90.0 wt. %, 15.0 to 85.0 wt. %, 15.0 to 75.0 wt. %, 15.0 to 50.0 wt. %, 15.0 to 45.0 wt. %, 15.0 to 30.0 wt. %, 15.0 to 25.0 wt %, 15.5 to 22.5 wt. %, 20.0 to 40.0 wt. %, or 20.0 to 30.0 wt. % of the ethylene-based polymer.

The term "ethylene-based polymer" as used herein refers to a polymer comprising at least 50.0 mole % of polymer units derived from ethylene. In some embodiments, the lower limit on the range of ethylene content may be 75.0 mole %, 80.0 mole %, 85.0 mole %, 90.0 mole %, 92.0 mole %, 94.0 mole %, 95.0 mole %, 96.0 mole %, 97.0 mole %, 98.0 mole %, 99.0 mole %, 99.5 mole %, or 100.0 mole % based on the mole % of polymer units derived from ethylene. Ethylene-based polymers of the invention can have an upper limit on the range of ethylene content of 80.0 mole %, 85.0 mole %, 90.0 mole %, 92.0 mole %, 94.0 mole %, 95.0 mole %, 96.0 mole %, 97.0 mole %, 98.0 mole %, 99.0 mole %, 99.5 mole %, or 100.0 mole %, based on polymer units derived from ethylene. Ethylene-based polymers generally have less than 50.0 mole % of polymer units derived from a $C_3$-$C_{20}$ olefin, preferably an alpha-olefin. The lower limit on the range of $C_3$-$C_{20}$ olefin-content may be 25.0 mole %, 20.0 mole %, 15.0 mole %, 10.0 mole %, 8.0 mole %, 6.0 mole %, 5.0 mole %, 4.0 mole %, 3.0 mole %, 2.0 mole %, 1.0 mole %, 0.5 mole %, or 0 mole %. based on polymer units derived from the $C_3$-$C_{20}$ olefin. The upper limit on the range of $C_3$-$C_{20}$ olefin-content may be 20.0 mole %, 15.0 mole 10.0 mole %, 8.0 mole %, 6.0 mole %, 5.0 mole %, 4.0 mole %, 3.0 mole %, 2.0 mole %, 1.0 mole %, 0.5 mole %, or 0 mole %, based on polymer units derived from the $C_3$-$C_{20}$ olefin. In some embodiments, low $C_3$-C20-olefin contents, e.g., 0.0-5.0 mole % are preferred. Comonomer content is based on the total content of all monomers in the polymer.

While any $C_3$-$C_{20}$-olefin may be used, alpha-olefins are preferred, particularly $C_4$-$C_8$ alpha-olefins, e.g., butene-1, pentene-1,4-methyl-1-pentene, hexene-1, otcene-1, more preferably butene-1, hexene-1 and otcene-1, most preferably hexene-1. Ethylene-based polymers having more than two types of monomers, such as terpolymers, are intended to be included within the term "polymer" or "copolymer" as used herein.

Preferably, the ethylene-based polymer is one having at least a first peak and a second peak in a comonomer distribution analysis, wherein the first peak has a maximum at a log(Mw) value of 4.0 to 5.4, particularly 4.3 to 5.0, more particularly 4.5 to 4.7; and a TREF elution temperature of 70.0° C. to 100.0° C., particularly 80.0° C. to 95.0° C., more particularly 85.0° C. to 90.0° C. The second peak in the comonomer distribution analysis has a maximum at a log (Mw) value of 5.0 to 6.0, particularly 5.3 to 5.7, more particularly 5.4 to 5.6; and a TREF elution temperature of 40.0° C. to 60.0° C., particularly 45.0° C. to 60.0° C., more particularly 48.0° C. to 54.0° C.

Ethylene-based polymers may also have one or more of the following properties.

Typically ethylene-based polymers suitable in embodiments of the invention having minimal long chain branching (i.e., less than 1.0 long-chain branch/1000 carbon atoms, preferably less than 0. long-chain branch/1000 carbon atoms, particularly 0.05 to 0.50 long-chain branch/1000 carbon atoms) and a density generally from about 0.910 g/cm$^3$ to about 0.955 g/cm$^3$.

While traditional metallocene-catalyzed LLDPEs generally have a broad composition distribution as measured by Composition Distribution Breadth index (CDBI) or solubility distribution breadth index (SDBI), ethylene-based polymers produced using the catalyst systems described herein have a CDBI preferably less than 35.0%. In one embodiment, the ethylene-based polymer has a CDBI of from 20.0% to 35.0%. In another embodiment, the ethylene-based polymer has a CDBI of from 25.0% to 28.0%. Further details of determining the CDBI or SDBI of a copolymer are known to those skilled in the art. See, for example, PCT Patent Application WO 93/03093, published Feb. 18, 1993.

Ethylene-based polymers produced using the catalyst systems described herein may have an SDBI greater than 15° C., or greater than 16° C., or greater than 17° C., or greater than 18° C., or greater than 19° C., or greater than 20° C. In one embodiment, the polymers have a SDBI of from about 18° C. to about 22° C. In another embodiment, the polymers have a SDBI of from about 18.7° C. to about 21.4° C. In another embodiment, the polymers have a SDBI of from about 20° C. to about 22° C.

The density may be in the range of from 0.86 g/cm$^3$ to 0.97 g/cm$^3$, preferably in the range of from 0.90 g/cm$^3$ to 0.960 g/cm$^3$, more preferably in the range of from 0.905 g/cm$^3$ to 0.955 g/cm3, 0.910 g/cm$^3$ to 0.955 g/cm$^3$, or from 0.910 to 0.925 g/cm$^3$. In some embodiments, ethylene-based polymer has a density of about 0.912 to about 0.925 g/cm$^3$, from about 0.915 to about 0.921 g/cm$^3$, or about 0.916 to 0.918 g/cm$^3$.

The weight average molecular weight ($M_w$) may be from about 15,000 to about 250,000 g/mol. Preferably, the weight average molecular weight is from about 20,000 to about 200,000 g/mol, or from about 25,000 to about 150,000 g/mol.

The ethylene-based polymers have a molecular weight distribution ($M_w/M_n$) of from about 1.5 to about 5.0, particularly from about 2.0 to about 4.0, preferably from about 3.0 to about 4.0 or from about 2.5 to about 4.0.

The ratio of the z-average molecular weight (Mz) to weight average molecular weight (Mw) may be greater than about 1.5 or greater than 1.7 or greater than about 2.0. In one embodiment, this ratio is from about 1.7 to about 15. In yet another embodiment, this ratio is from about 2.0 to about 3.0, or from about 2.2 to about 3.0.

The ethylene-based polymers in certain embodiments have a melt index (MI) or ($I_{2.16}$) as measured by ASTM D-1238-F (190° C./2.16 kg) of about 0.1 to about 300 dg/min, preferably about 0.1 to about 100 dg/min, about 0.1 to about 50 dg/min. about 0.1 dg/min to about 5.0 dg/min, about 0.2 to 1.5 dg/min, about 0.3 to 1.0 dg/min, 0.5 to 1.0 dg/min, 0.6 to 1.0 dg/min, 0.7 to 1.0 dg/min, or 0.75 to 0.95 dg/min, particularly about 0.8 dg/min.

Some ethylene-based polymers have a. melt index ratio ($I_{21.6}/I_{2.16}$) ($I_{21.6}$ is measured by ASTM D-1238-F, i.e., 190° C./21.6 kg) of from about 10.0 to about 50.0. The polymers, in a preferred embodiment, have a melt index ratio of from about 15.0 to about 45.0, more preferably from about 20.0 to about 40.0, or from about 22 to about 38.

In some embodiments, ethylene-based polymers exhibit a melting temperature as measured by differential scanning calorimetry ("DSC") of from about 90° C. to about 130° C. An exemplary method of identifying a composition's melting temperature is determined by first pressing a sample of the composition at elevated temperature and removing the sample with a punch die. The sample is then annealed at room temperature. After annealing, the sample is placed in a differential scanning calorimeter, e.g., Perkin Elmer 7 Series Thermal Analysis System, and cooled. Then the sample is heated to a final temperature and the thermal output, $\Delta H_f$, is recorded as the area under the melting peak curve of the sample. The thermal output in joules is a measure of the heat of fusion. The melting temperature, $T_m$, is recorded as the temperature of the greatest heat absorption within the range of melting of the sample. This is called the first melt. $T_{c1}$ is the first non-isothermal crystallization temperature, which is recorded as the temperature of greatest heat generation. The sample is then cooled. The sample is reheated to form a second melt, which is more reproducible than the first melt. The peak melting temperature from the second melt is recorded as the second melting temperature, $T_m$. $T_{c2}$ is second non-isothermal crystallization temperature, and $\Delta H_{c2}$ is the second heat of crystallization. Preferably, ethylene-based polymers of these embodiments exhibit a $2^{nd}$ melt temperature of from about 100° C. to about 130° C. or about 110° C. to about 130° C., or from about 119° C. to about 123° C. Preferably, ethylene-based polymers of these embodiments exhibit a first melt temperature of from about 95° C.; to about 125° C., or from about 100° C. to about 118° C., or from about 107° C. to about 110° C.

In another embodiment, the ethylene-based polymers described herein contain less than 5.0 ppm hafnium, generally less than 2.0 ppm hafnium, preferably less than 1.5 ppm hafnium, more preferably less than 1.0 ppm hafnium. In an embodiment, the polymer contains in the range of from about 0.01 ppm to about 2 ppm hafnium, preferably in the range of from about 0.01 ppm to about 1.5 ppm hafnium, more preferably in the range of from about 0.01 ppm to 1.0 ppm hafnium. Preferably, the amount of hafnium is greater than the amount of zirconium in the ethylene-based polymer. In other words, in particular embodiments the ratio of hafnium to zirconium (ppm/ppm) is at least 2.0, at least 10.0, at least 15, at least 17.0, at least 20.0, or at least about 25.0. While zirconium generally is present as an impurity in hafnium, it will be realized in some embodiments where particularly pure hafnium-containing catalysts are used, the amount of zirconium may be extremely low, resulting in an undetectable amount of zirconium in the ethylene-based polymer. Thus, the upper limit on the ratio of hafnium to zirconium in the polymer can be 50.0, 100.0, 200.0, 500 or more.

Particular ethylene-based polymers have at least a first peak and a second peak in a comonomer distribution analysis, wherein the first peak has a maximum at a log(Mw) value of 4.0 to 5.4, particularly 4.3 to 5.0, more particularly 4.5 to 4.7; and a TREF elution temperature of 70.0° C. to 100.0° C., particularly 80.0° C. to 95.0° C., more particularly 85.0° C. to 90.0° C. The second peak in the comonomer distribution analysis has a maximum at a log(Mw) value of 5.0 to 6.0, particularly 5.3 to 5.7, more particularly 5.4 to 5.6; and a TREF elution temperature of 40.0° C. to 60.0° C., particularly 45.0° C. to 60.0° C., more particularly 48.0° C. to 54.0° C.; a melt index (190° C./2.16 kg) of from about 0.1 g/10 min. to about 5.0 g/10 min.; a melt index ratio of from about 15 to about 30; a Mw of from about 20,000 to about 200,000 g/mol; a Mw/Mn of from about 2.0 to about 4.5; and a density of from 0.910 to 0.925 g/cm$^3$. More preferred polymers also have therein an amount of hafnium that is greater than the amount of zirconium, particularly a ratio of hafnium to zirconium (ppm/ppm) is at least 2.0, at least 10.0, at least 15.0, at least 17.0, at least 20.0, or at least about 25.0.

Polymerization processes for making ethylene-based polymer described herein are disclosed in U.S. Pat. No. 6,956,088 to Farley, including use of a hafnium transition metal metallocene-type catalyst system as described in U.S. Pat. No. 6,242,545 and/or U.S. Pat. No. 6,248.845, particularly Example 1, hereby incorporated by reference.

While the polymerization processes are described therein, certain features are reproduced here for convenience.

As described therein, polymerization catalyst in a supported form, for example deposited on, bonded to, contacted with, or incorporated within, adsorbed or absorbed in, or on, a support or carrier may be used. The metallocene catalyst may be introduced onto a support by slurrying a presupported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. Very low solubilizing media such as mineral oil (e.g., Kaydo™ or Drakol™) or pentane may be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. The mixing time may be greater than 4 hours, but shorter times are suitable.

The substituted bulky ligand hafnium transition metal metallocene-type catalyst compounds and catalyst systems discussed above are suited for the polymerization of monomers, and optionally one or more comonomers, in any polymerization process, solution phase, gas phase or slurry phase. Typically in a gas phase polymerization process a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399; 4,588,790; 5,028,670; 5,317,036; 5,352,749; 5,405,922; 5.436,304; 5.453,471; 5.462,999; 5.616,661; and 5,668,228, all of which are fully incorporated herein by reference.)

Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. The reactor pressure may vary from 100-500 psig (680-3448 kPag), or in the range of from 200-400 psig (1379-2759 kPag), or in the range of from 250-350 psig (1724-2414 kPag). The reactor temperature may vary between 60-120° C., or 60-115° C., or in the range of from 70-110° C., or in the range of from 70-95° C., or 70-90° C. The productivity of the catalyst or catalyst system is influenced by the main monomer partial pressure. The mole percentage of the main monomer, ethylene, is from 25.0-90.0 mole %, or 50.0-90.0 mole %, or 70.0-85.0 mole %, and the monomer partial pressure is in the range of from 75-300 psia (517-2069 kPa), or 100-275 psia (689-1894 kPa), or 150-265 psia (1034-1826 kPa), or 200-250 psia (1378-1722 kPa), typical conditions in a gas phase polymerization process.

Other gas phase processes contemplated by the process of the invention include those described in U.S. Pat. Nos. 5,627,242; 5,665,818; and 5,677,375, and European publications EP-A-0791200, EP-A-0802202 and EP-B-631421, all of which are herein fully incorporated by reference.

It may be beneficial to operate in the substantial absence of or essentially free of any scavengers, such as triethylaluminum, trimethylaluminum, triisobutylaluminum and tri-n-hexylaluminum and diethyl aluminum chloride and the like. This process is described in PCT publication WO 96/08520, which is herein fully incorporated by reference.

A slurry polymerization process generally uses pressures in the range of 1 to 50 atmospheres and even greater and temperatures in the range of 0° C. to 200° C. In a slurry polymerization, a suspension of solid, particulate polymer is formed in a liquid polymerization medium to which ethylene and comonomers and often hydrogen along with catalyst are added. The liquid employed in the polymerization medium can be alkane or cycloalkane, or an aromatic hydrocarbon such as toluene, ethylbenzene or xylene. The medium employed should be liquid under the conditions of polymerization and relatively inert. Hexane or isobutane medium may be employed.

Ethylene-based polymers may be prepared by a process referred to as a particle form, or slurry process where the temperature is kept below the temperature at which the polymer goes into solution. Such technique is well known in the art, see for instance U.S. Pat. No. 3,248,179, which is fully incorporated herein by reference. The temperature in the particle form process is within the range of 85-110° C. (185-230° F.) Two polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

Typical reactors for producing ethylene-based polymers are capable of producing greater than 500 lbs/hr (227 Kg/hr) to 200,000 lbs/hr (90,900 Kg/hr) or higher of polymer, or greater than 1000 lbs/hr (455 Kg/hr), or greater than 10,000 lbs/hr (4540 Kg/hr), or greater than 25,000 lbs/hr (11,300 Kg/hr), or greater than 35,000 lbs/hr (15,900 Kg/hr), or greater than 50,000 lbs/hr (22,700 Kg/hr), or greater than 65,000 lbs/hr (29,000 Kg/hr) to greater than 100,000 lbs/hr (45,500 Kg/hr).

Persons having skill in the art will recognize that the above-described processes may be tailored to achieve desired ethylene-based polymer resins. For example, comonomer to ethylene concentration or flow rate ratios are commonly used to control resin density. Similarly, hydrogen to ethylene concentrations or flow rate ratios are commonly used to control resin molecular weight. In both cases, higher levels of a modifier results in lower values of the respective resin parameter. Gas concentrations may be measured by, for example, an on-line gas chromatograph or similar apparatus to ensure relatively constant composition of recycle gas streams.

Additionally, the use of a process continuity aid, while not required, may be desirable in preparing the ethylene-based polymers, particularly for large-scale production. Such continuity aids are well known to persons of skill in the art and include, for example, metal stearates.

Blends and Films

The heterogeneously branched ethylene polymer and ethylene-based polymer compositions described herein are particularly useful in monolayer films. Such films show a surprising combination of properties. For example, the compositions can provide a film having a MD Elmendorf Tear value greater than the MD Elmendorf Tear value for the polymer composition predicted by the line connecting the individual MD Elmendorf Tear values of the heterogeneously branched polymer and the ethylene-based polymer. In other words, there is a surprising synergistic effect in the MD Elmendorf Tear performance in compositions and films made from the heterogeneously branched ethylene polymer and ethylene-based polymer compositions described herein.

Such synergism is revealed by compositions and particularly monolayer films made therefrom having a MD Elmendorf Tear value greater than the MD Elmendorf Tear value for the polymer composition on the line connecting the individual MD Elmendorf Tear values of the heterogeneously branched polymer and the ethylene-based polymer. Particular compositions and films have a MD Elmendorf Tear value is at least 2.0% greater than, at least 5.0% greater than, at least 10.0% greater than, at least 15.0% greater than, at least 20.0% greater than, at least 30.0% greater than, at least 50.0% greater than, at least 100.0% greater than, at least 125.0% greater than, at least150.0% greater than, or at least 200.0% greater than the expected MD Elmendorf Tear value for the polymer composition in particular embodiments the MD Eimendorf Tear value is 5.0 to 200.0% greater than, 10.0 to 200.0% greater than, 20.0 to 200.0% greater than, 30.0 to 200.0% greater than, 40.0 to 200.0% greater than, 50.0 to 200.0% greater than, 60.0 to 200.0% greater than, 70.0 to 200.0% greater than, 80.0 to 200.0% greater than, 90.0 to 200.0% 100.0 to 200.0% greater than, 125.0 to 200.0% greater than, 10.0 to 150.0% greater than, 20.0 to 150.0% greater than, 30.0 to 150% greater than, 40.0 to 150.0% greater than, 50.0 to 150.0% greater than, 60.0 to 150.0% greater than, 70.0 to 150.0% greater than, 80.0 to 150.0% greater than, 90.0 to 150.0% 100.0 to 150.0% greater than, 125.0 to 150.0% greater than, 10.0 to 100.0% greater than, 20.0 to 100.0% greater than, 30.0 to 100.0% greater than, 40.0 to 100.0% greater than, 50.0 to 100.0% greater than, 60.0 to 100.0% greater than, 70.0 to 100.0% greater than, 80.0 to 100.0% greater than, 90.0 to 100.0%, 10.0 to 90.0% greater than, 20.0 to 80.0% greater than, 30.0 to 75% greater than, 40.0 to 70.0% greater than, 35.0 to 60.0% greater than, 40.0 to 55.0% greater than, or 45.0 to 50.0% greater than the expected value of the MD Elmendorf Tear value. The expected MD Elmendorf Tear value is the MD Elmendorf Tear value for the polymer composition on the line connecting the individual MD Eimendorf Tear values of the heterogeneously branched polymer and the ethylene-based polymer can be determined by first plotting the individual MD Elmendorf Tear values of the heterogeneously branched polymer and the ethylene-based polymer relative to the content of the heterogeneously branched polymer. In such a plot, the MD Elmendorf Tear value of the heterogeneously branched polymer would appear at a value of 100.0 wt. % and the MD Eimnendorf Tear value of the ethylene-based polymer would appear at a value of 0.0 wt. %. The equation of the straight line connecting these two points can easily be determined. The expected MD Elmendorf Tear value for a blend is then calculated using the wt % of heterogeneously branched polymer in the blend in the straight line equation.

Particular compositions and films may have a Dart A Impact>200.0 g/mil, ≥400.0 g/mil, ≥500.0 g/mil, ≥700.0 g/mil, ≥800.0 g/mil, ≥900.0 g/mil, ≥1000.0 g/mil, ≥1100.0 g/mil, ≥1200.0 g/mil, particularly from 200.0 to 1400.0 g/mil, 700.0 to 1400.0 g/mil, or 700.0 to 1200.0 g/mil in combination with the surprising MD Elmendorf Tear performance.

When used in multilayer films, the polymer compositions described herein, including the heterogeneously branched ethylene polymer and the ethylene-based polymer may be used in any layer of the film, or in more than one layer of the film, as desired. When more than one layer of the film comprises such a polymer composition, each such layer can be individually formulated, i.e., the layers comprising such a polymer composition can be the same or different within the scope of the claims, depending upon the desired properties of the film.

To facilitate discussion of different film structures, the following notation is used herein. Each layer of a film is denoted "A" or "B", where "A" indicates a conventional film layer as defined below, and "B" indicates a film layer comprising the heterogeneously branched ethylene polymer and the ethylene-based polymer. Where a film includes more than one A layer or more than one B layer, one or more prime symbols (', ", '", etc.) are appended to the A or B symbol to indicate layers of the same type (conventional or inventive) that can be the same or can differ in one or more properties, such as chemical composition, density, melt index, thickness, etc. Finally, the symbols for adjacent layers are separated by a slash Using this notation, a three-layer film having an inner layer of the heterogeneously branched ethylene polymer and the ethylene-based polymer blend disposed between two outer, conventional film layers would be denoted A/B/A'. Similarly, a five-layer film of alternating conventional/inventive layers would be denoted A/B/A'/B'/A". Unless otherwise indicated, the left-to-right or right-to-left order of layers does not matter, nor does the order of prime symbols; e.g., an A/B film is equivalent to a WA film, and an A/A'/B/A" film is equivalent to an A/B/A'/A" film. The relative thickness of each film layer is similarly denoted, with the thickness of each layer relative to a total film thickness of 100 (dimensionless) indicated numerically and separated by slashes; e.g., the relative thickness of an A/B/A' film having A and A' layers of 10 μm each and a B layer of 30 μm is denoted as 20/60/20.

For the various films described herein, the "A" layer can comprise any material known in the art for use in multilayer films or in film-coated products. Thus, for example, each A layer can be formed of a polyethylene homopolymer or copolymer, and the polyethylene can be, for example, a VLDPE, a LDPE, a LLDPE, a MDPE, a HDPE, or a DPE, as well as other polyethylenes known in the art. The polyethylene can be produced by any suitable process, including metallocene-catalyzed processes and Ziegler-Natta catalyzed processes. Further, each A layer can be a blend of two or more such polyethylenes, and can include additives known in the art. Further, one skilled in the art will understand that the layers of a multilayer film must have the appropriate viscosity match. Examples of suitable A layers are described in U.S. Patent Application No. 2008/0038533, filed Apr. 24, 2007, the disclosure of which is incorporated herein by reference in its entirety.

In particular embodiments, the "B" layer comprises any blend of the heterogeneously branched ethylene polymer and ethylene-based described herein, in some embodiments, the B layer consists essentially of the heterogeneously branched ethylene polymer and ethylene-based blend described herein. In other embodiments, the B layer may also include another polymer component, e.g., LDPE. In still other embodiments, the B layer comprises (a) from 0.1 to 99.9 wt. %, 10.0 to 90.0 wt. %, 20.0 to 80.0 wt. %, 30.0 to 70.0 wt. %, 40.0 to 60.0 wt. %, or 45.0 to 55.0 wt. % of the heterogeneously branched ethylene polymer and ethylene-based blend as described herein; and (b) from 99.9 to 0.1 wt. %, 90.0 to 10.0 wt. %, 80.0 to 20.0 wt. %, 70.0 to 30.0 wt. %, 60.0 to 40.0 wt. %, or 55.0 to 45.0 wt. %, of a polymer selected from the group consisting of very low density polyethylene, medium density polyethylene, differentiated polyethylene, and combinations thereof, wherein the wt. % values are based on the total weight of the film.

The thickness of each layer of the film, and of the overall film, is not particularly limited, but is determined according to the desired properties of the film. Typical film layers have a thickness of from about 1 to about 1000 µm, more typically from about 5 to about 100 µm, and typical films have an overall thickness of from about 10 to about 100 µm.

Such films may be formed by any number of well-known extrusion or coextrusion techniques discussed below. Films may be unoriented, uniaxially oriented or biaxially oriented. Physical properties of the film may vary depending on the film forming techniques used.

Particular Embodiments

Embodiment A. A polymer composition comprising: (A) 5.0 to 95.0 wt. % of a heterogeneously branched ethylene polymer having polymer units derived from at least one $C_3$-$C_{20}$ alpha-olefin and having a CBDI<50.0%; and (B) 5.0 to 95.0 mole % of an ethylene-based polymer, wherein the composition has a MD Elmendorf Tear value greater than the MD Elmendorf Tear value for the polymer composition on the line connecting the individual MD Elmendorf Tear values of the heterogeneously branched polymer and the ethylene-based polymer.

Embodiment B. The polymer composition of Embodiment A comprising 15.0 to 50.0 mole %, 15.0 to 30.0 mole %, 15.0 to 25.0 mole %, or 15.5 to 22.5 mole %, of the heterogeneously branched ethylene polymer.

Embodiment C. The polymer composition of Embodiment A or Embodiment B, wherein the heterogeneously branched ethylene polymer comprises 2.0 to 20.0 mole %, 2.0 to 15.0 mole %, or 5.0 to 10.0 mole %, polymer units derived from a $C_4$-$C_8$ alpha-olefin.

Embodiment D. The polymer composition of any of Embodiments A to C, wherein the heterogeneously branched ethylene polymer has a density of 0.915 to 0.950 g/cm³, preferably 0.920 to 0.940 g/cm³.

Embodiment E. The polymer composition of any of Embodiments A to D, wherein the heterogeneously branched ethylene polymer has a melt index according to ASTM D-1238-E (190° C./2.16 kg) of 0.50 to 60.0 g/10 min., preferably 0.50 to 5.0 g/10 min.

Embodiment F. The polymer composition of any of Embodiments A to E, wherein the ethylene-based polymer has at least a first peak and a second peak in a comonomer distribution analysis, wherein the first peak has a maximum at a log(Mw) value of 4.0 to 5.4 and a TREF elution temperature of 70.0° C. to 100.0° C. and the second peak has a maximum at a log(Mw) value of 5.0 to 6.0 and a TREF elution temperature of 40.0° C. to 70.0° C.

Embodiment G. The polymer composition of any of Embodiments A to F, wherein the ethylene-based polymer has at least a first peak and a second peak in a comonomer distribution analysis, wherein the first peak has a maximum at a log(Mw) value of 4.3 to 5.0 and a TREF elution temperature of 80.0° C. to 95.0° C. and the second peak has a maximum at a log(Mw) value of 5.3 to 5.7 and a TREF elution temperature of 45.0° C. to 60.0° C.

Embodiment H. The polymer composition of any of Embodiments A to G, wherein the ethylene-based polymer has at least a first peak and a second peak in a comonomer distribution analysis, wherein the first peak has a maximum at a log(Mw) value of 4.5 to 4.7 and a TREF elution temperature of 85.0° C. to 90.0° C. and the second peak has a maximum at a log(Mw) value of 5.4 to 5.6 and a TREF elution temperature of 48.0° C. to 54.0° C.

Embodiment I. The polymer composition of any of Embodiments A to H, wherein the ethylene-based polymer has i) a melt index of from about 0.1 g/10 min. to about 5.0 g/10 min.; ii) a melt index ratio of from about 15 to about 30; iii) a weight average molecular weight (Mw) of from about 20,000 to about 200,000 g/mol; iv) a molecular weight distribution (Mw/Mn) of from about 2.0 to about 4.5; and v) a density of from 0.910 to 0.925 g/cm³.

Embodiment J. The polymer composition of any of Embodiments A to I, wherein the MD Elmendorf Tear value is at least 2.0% greater than, at least 5.0% greater than, at least 10.0% greater than, at least 15.0% greater than, at least 20.0% greater than, at least 30.0% greater than, or at least 50.0% greater than the MD Elmendorf Tear value for the polymer composition on the line connecting the individual MD Elmendorf Tear values of the heterogeneously branched polymer and the ethylene-based polymer.

Embodiment K. The composition of any of Embodiments A to J, having a Dart A Impact≥200.0 g/mil, ≥400.0 g/mil, ≥500.0 g/mil, ≥700.0 g/mil, ≥800.0 g/mil, ≥900.0 g/mil, ≥1000.0 g/mil, ≥1100.0 g/mil, ≥1200.0 g/mil, particularly from 700.0 to 1200.0 g/mil.

Embodiment L. A polymer film comprising at least one layer, said at least one layer comprising: (A) 5.0 to 95.0 wt % of a heterogeneously branched ethylene polymer having polymer units derived from at least one $C_3$-$C_{20}$ alpha-olefin and having a SCBDI of <50.0%; and (B) 95.0 to 5.0 mole % of an ethylene-based polymer having at least a first peak and a second peak in a cornonomer distribution analysis, wherein the first peak has a maximum at a log(Mw) value of 4.0 to 5.4 and a TREF elution temperature of 70.0° C. to 100.0° C. and the second peak has a maximum at a log(Mw) value of 5.0 to 6.0 and a TREF elution temperature of 40.0° C. to 60.0° C.

Embodiment M. The polymer film of Embodiment L, having a MD Elmendorf Tear value greater than an expected value of the MD Elmendorf Tear value, wherein the expected value is the value at the composition the polymer film on the line connecting the MD Elmendorf Tear value of a film of the heterogeneously branched polymer and the MD Elmendorf Tear value of a film of the ethylene-based polymer.

Embodiment N. The polymer film of Embodiment L or Embodiment M, comprising 15.0 to 50.0 mole %, 15.0 to 30.0 mole %, 15.0 to 25.0 mole %, or 15.5 to 22.5 mole %, of the heterogeneously branched ethylene polymer.

Embodiment O. The polymer film of any of Embodiments L to N, wherein the heterogeneously branched ethylene polymer comprises 2.0 to 20.0 mole %, 2.0 to 15.0 mole %, or 5.0 to 10.0 mole %, polymer units derived from a $C_4$-$C_8$ alpha-olefin.

Embodiment P. The polymer film of any of Embodiments L to O, wherein the heterogeneously branched ethylene polymer has a density of 0.915 to 0.950 g/cm³, preferably 0.92.0 to 0.940 g/cm³.

Embodiment Q. The polymer film of any of Embodiments L to P, wherein the heterogeneously branched ethylene polymer has a melt index according to ASTM D-1238-E (190° C./2.16 kg) of 0.50 to 60.0 g/10 min., preferably 0.50 to 5.0 g/10 min.

Embodiment R. The polymer film of any of Embodiments L to Q, wherein the ethylene-based polymer has at least a first peak and a second peak in a comonomer distribution analysis, wherein the first peak has a maximum at a log(Mw) value of 4.0 to 5.4 and a TREF elution temperature of 70.0° C. to 100.0° C. and the second peak has a maximum at a log(Mw) value of 5.0 to 6.0 and a TREF elution temperature of 40.0° C. to 70.0° C.

Embodiment S. The polymer film of any of Embodiments L to R, wherein the ethylene-based polymer has at least a first peak and a second peak in a comonomer distribution analysis, wherein the first peak has a maximum at a log(Mw) value of 4.3 to 5.0 and a TREF elution temperature of 80.0° C. to 95.0° C. and the second peak has a maximum at log(Mw) value of 5.3 to 5.7 and a TREF elution temperature of 45.0° C. to 60.0° C.

Embodiment T. The polymer film of any of Embodiments L to S, wherein the ethylene-based polymer has at least a first peak and a second peak in a comonomer distribution analysis, wherein the first peak has a maximum at a log(Mw) value of 4.5 to 4.7 and a TREF elution temperature of 85.0° C. to 90.0° C. and the second peak has a maximum at a log(Mw) value of 5.4 to 5.6 and a TREF elution temperature of 48.0° C. to 54.0° C.

Embodiment U. The polymer film of any of Embodiments L to T, wherein the ethylene-based polymer has i) a melt index of from about 0.1 g/10 min. to about 5.0 g/10 min.; ii) a melt index ratio of from about 15 to about 30; iii) a weight average molecular weight (Mw) of from about 20,000 to about 200,000 g/mol; iv) a molecular weight distribution (Mw/Mn) of from about 2.0 to about 4.5; and y) a density of from 0.910 to 0.925 g/cm$^3$.

Embodiment V. The polymer film of any of Embodiments L to U, wherein the MD Elmendorf Tear value is at least 2.0% greater than, at least 5.0% greater than, at least 10.0% greater than, at least 15.0% greater than, at least 20.0% greater than, at least 30.0% greater than, or at least 50.0% greater than the MD Elmendorf Tear value for the polymer composition on the line connecting the individual MD Elmendorf Tear values of the heterogeneously branched polymer and the ethylene-based polymer.

Embodiment W. The polymer film of any of Embodiments L to V having a Dart A impact≥200.0 g/mil, ≥400.0 g/mil, ≥500.0 g/mil, ≥700.0 g/mil, ≥800.0 g/mil, ≥900.0 g/mil, ≥1000.0 g/mil, ≥1100.0 g/mil, ≥1200.0 g/mil, particularly from 700.0 to 1200.0 g/mil.

Embodiment X. The polymer film of any of Embodiments L to O, wherein the film is a monolayer film.

EXAMPLES

Test Methods

The properties described herein can be determined in accordance with the following test procedures. Where any of these properties are referenced in the appended claims, it is to be measured in accordance with the specified test procedure.

Gauge, reported in μm, is measured using a Measuretech Series 200 instrument. The instrument measures film thickness using a capacitance gauge. For each film sample, ten film thickness datapoints are measured per inch of film as the film is passed through the gauge in a transverse direction. From these measurements, an average gauge measurement is determined and reported.

Tensile Strength at Yield, reported in pounds per square inch (lb/in$^2$ or psi), was measured as specified by ASTM D-882.

Tensile Strength at Break; reported in pounds per square inch (lb/in$^2$ or psi), was measured as specified by ASTM D-882.

Tensile Strength at 200% Elongation, reported in pounds per square inch (lb/in$^2$ or psi), was measured as specified by ASTM D-882.

Ultimate Tensile Strength, reported in pounds per square inch (lb/in$^2$ or psi), was measured as specified by ASTM D-882.

Tensile Peak Load, reported in pounds b), was measured as specified by ASTM D-882.

Tensile Energy, reported in inch-pounds b), was measured as specified by ASTM D-882.

Elongation at Yield, reported as a percentage (%), was measured as specified by ASTM D-882.

Elongation at Break, reported as a percentage (%), was measured as specified by ASTM D-882.

1% Secant Modulus (M), reported in pounds per square inch (lb/in$^2$ or psi), was measured as specified by ASTM D-882.

Haze, reported as a percentage (%), was measured as specified by ASTM D-1003.

Density, reported in grams per cubic centimeter (g/cm$^3$), was determined using chips cut from plaques compression molded in accordance with ASTM D-1928 Procedure C, aged in accordance with ASTM D-618 Procedure A, and measured as specified by ASTM D-1505.

Dart $F_{50}$, or Dart Drop A Impact or Dart Drop Impact Strength (DIS), reported in grams (g) and/or grams per mil (g/mil), was measured as specified by ASTM D-1709, method A.

Peak Puncture Force, reported in pounds (lb) and/or pounds per mil (lb/mil), was determined according to ASTM D-3763.

Puncture Break Energy, reported in inch-pounds (in-lb) and/or inch-pounds per mil (in-lb/mil), was determined according to ASTM D-3763.

Ethylene-Based Polymers of the Examples

Elmendorf Tear Was Determined According to ASTM D-1922

PEI is made according to U.S. Pat. No. 6,956,088 using the bis(n-propylcyclopentadienyl)HfCl$_2$/MAO catalyst system under polymerization conditions to produce an ethylene-based polymer (PEI) having a density of 0.918 g/cm$^3$, a melt index ($I_{2.16}$) of 0.80 g/10 min., and a melt index ratio ($I_{21.6}/I_{2.16}$) of 32. As shown in FIG. 1, PE1 has a first peak corresponding to a log(Mw) value of about 4.5 that appears at a TREF elution temperature of 91.0° C. and a second peak at a log(Mw) value of 5.3 and a TREF elution temperature of 63.0° C.

Figure 2:
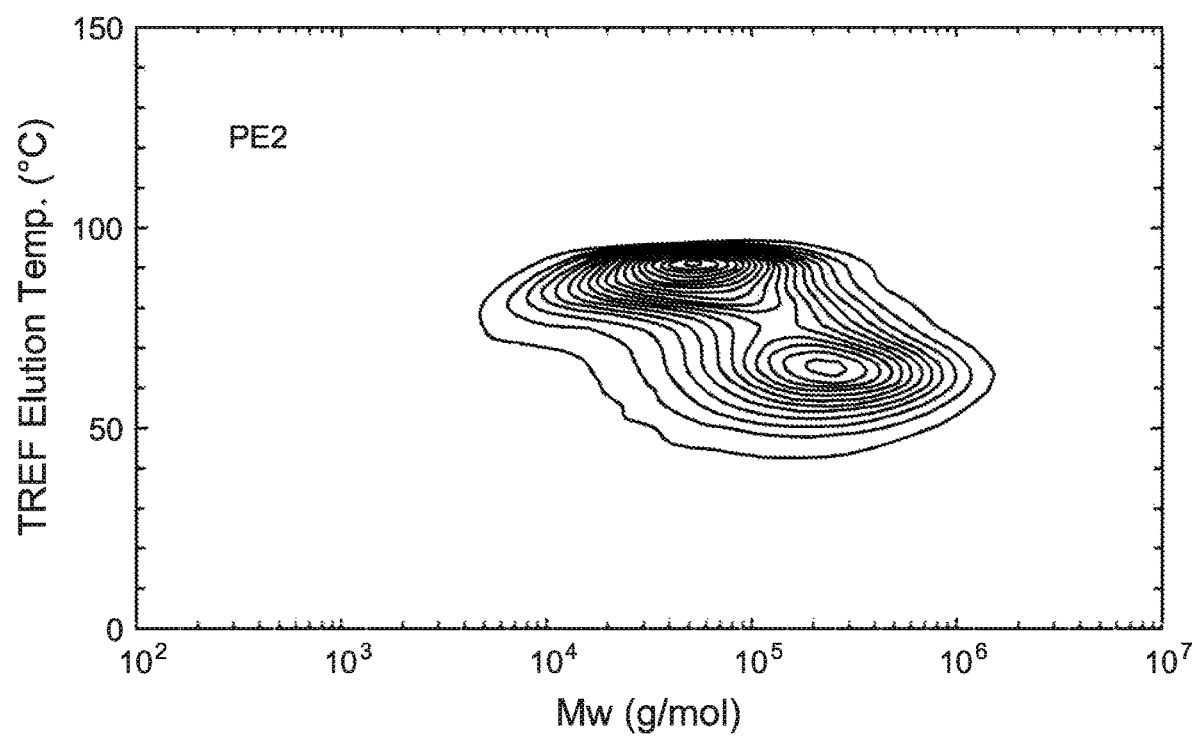

PE2 is made according to U.S. Pat. No. 6,956,088 using the bis(n-propylcyclopentadienyl)HfCl$_2$/MAO catalyst system under polymerization conditions to produce an ethylene-based polymer (PE2) having a density of 0.916 g/cm$^3$ and a melt index ($I_{2.16}$) of 0.70 g/10 min. As shown in FIG. 2, PE2 has a first peak corresponding to a log(Mw) value of about 4.5 that appears at a TREF elution temperature of 91.0° C. and a second peak at a log(Mw) value of 5.2 and a TREF elution temperature of 63.0° C.

Figure 3:
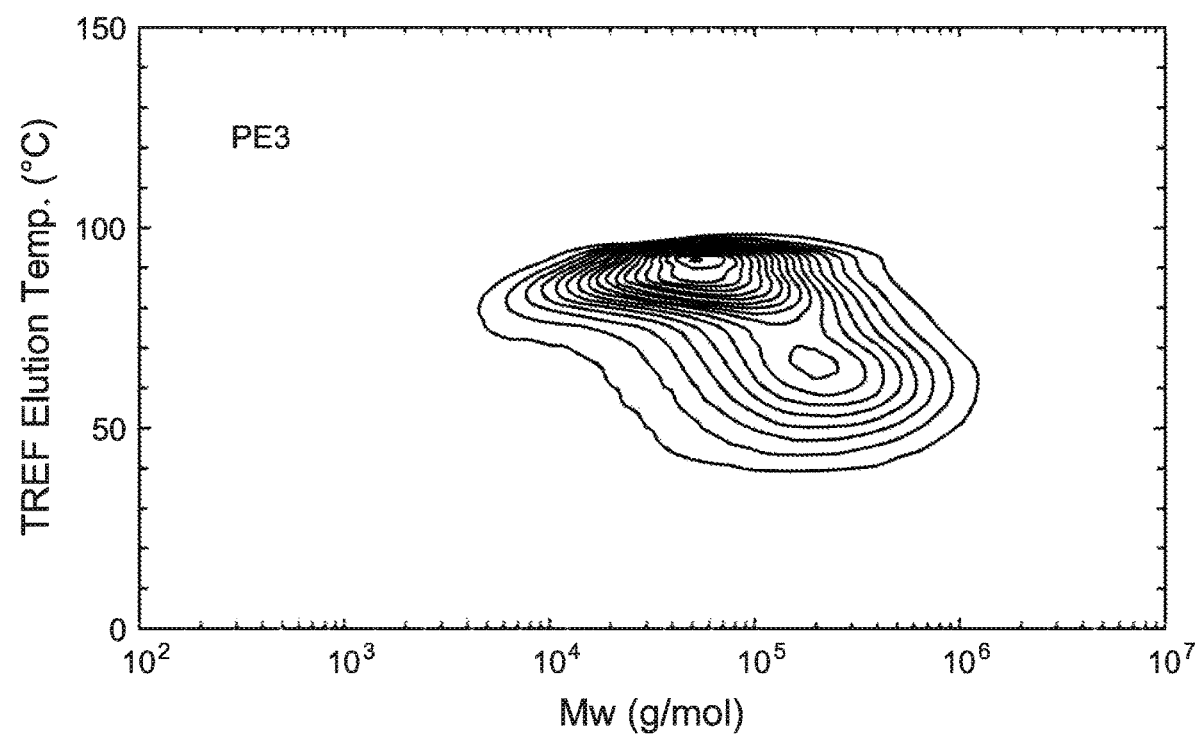

PE3 is made according to U.S. Pat. No. 6,956,088 using the bis(n-propylcyclopentadienyl)HfCl$_2$/MAO catalyst system under polymerization conditions to produce an ethylene-based polymer (PE3) having a density of 0.917 g/cm³, a melt index ($I_{2.16}$) of 0.90 g/10 min., a melt index ratio ($I_{21.6}/I_{2.16}$) of 24.4. As shown in FIG. 3, PE3 has a first peak corresponding to a log(Mw) value of about 4.4 that appears at a TREF elution temperature of 91.0° C. and a second peak at a log(Mw) value of 5.1 and a TREF elution temperature of 62.0° C.

Examples 1-7

Figure 4:
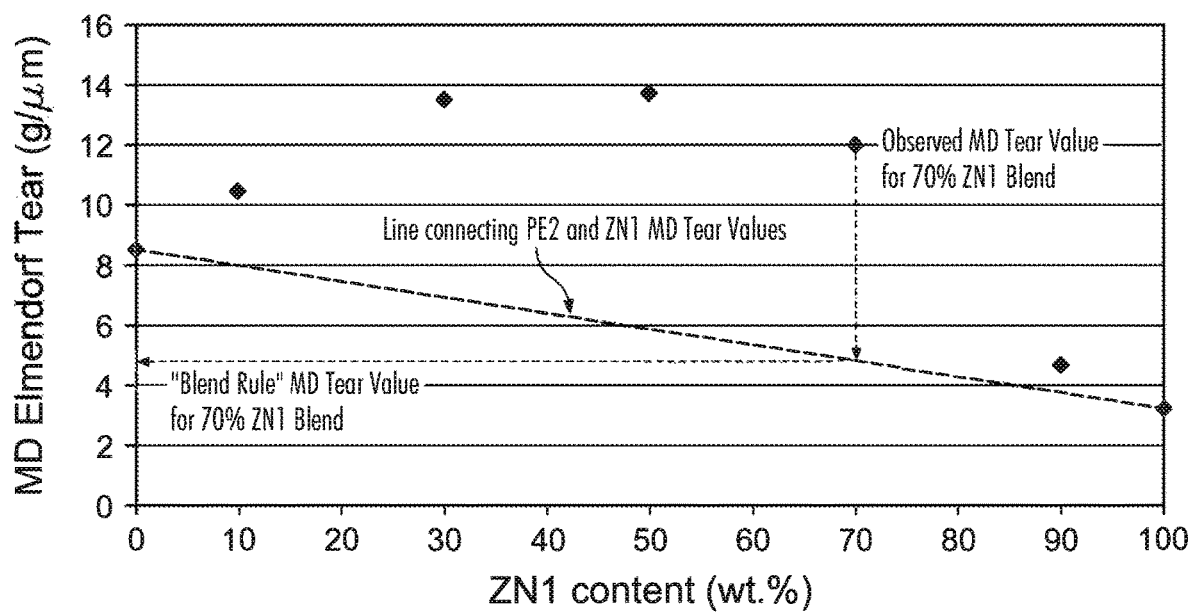

In Examples 1-7, the ethylene-based polymer PE2 is blended with varying amounts of a heterogeneously branch linear copolymer of ethylene and 1-butene prepared by Ziegler-Natta polymerization having a melt index ($I_{2.16}$) of 1.0 g/10 min. and a density of 0.918 g/cm³, available from ExxonMobil Chemical Company as LLDPE 1001XV (referred to as ZN1). The blends are formed into films. Several measurements of the MD Elmendorf Tear and Dart Impact properties for these films, of which the average values are recorded in Table 1. As shown in FIG. 4, blends of the ethylene-based polymer PE2 and ZN1 possess a higher MD Tear value than that of either PE2 or ZN1 alone.

TABLE 1

| Example No. | PE2:ZN1 (wt. %) | MD Elmendorf Tear (g/μm) | Dart A Impact (g/μm) |
|---|---|---|---|
| 1 | 100:0 | 8.5 | 60.2 |
| 2 | 90.0:10.0 | 10.5 | 79.5 |
| 3 | 70.0:30.0 | 13.5 | 64.2 |
| 4 | 50.0:50.0 | 13.7 | 15.5 |
| 5 | 30.0:70.0 | 12.0 | 6.1 |
| 6 | 10.0:90.0 | 4.7 | 4.3 |
| 7† | 0:100 | 3.2 | 3.9 |

†Film (1 mil/25.4 um) is made with ExxonMobil LLDPE 1001 with add-package X26 on a 2.5 in blown film line having a 6 inch die with a 60 mil die gap at a 2.5:1 blow-up ratio at a melt temperature of 198-202° C.

The equation for the line connecting the individual MD Elmendorf Tear values of the heterogeneously branched polymer and the ethylene-based polymer can be easily determined from the values in Table 1:

$$MDTear_x = \frac{MDTear_{100}^{ZN1} - MDTear_0^{ZN1}}{100 \text{ wt. } \% - 0 \text{ wt. } \%} \text{wt. } \%_x^{ZN1} + MDTear_0^{ZN1} \quad (1)$$

$$MDTear_x = \frac{3.2/\mu m - 8.5 \text{ g}/\mu m}{100 \text{ wt. }\%} \text{wt. } \%_x^{ZN1} + 8.5 \text{ g}/\mu m \quad (2)$$

$$MDTear_x = (-.053 \text{ g}/\mu m * \text{wt } \%^{ZN1}) * \text{wt. } \%_x^{ZN1} + 8.5 \text{ g}/\mu m \quad (3)$$

So for example, the value on the line connecting the individual MD Elmendorf Tear values of the heterogeneously branched polymer and the ethylene-based polymer the expected value) for a blend comprising 50.0 wt. % ZN 1 and 50.0 wt. % PE2 is:

$$MDTear_{50}=(-0.053 \text{ g}/\mu m * \text{wt } \%^{ZN1})*50.0 \text{ wt. } \%+ 8.5 \text{ g}/\mu m=5.85 \text{ g}/\mu m \quad (4)$$

The observed MD Tear for a blend comprising 50 wt. % ZN1 and 50 wt. % PE2, however, is 13.7 g/μm, 134% greater than that expected by the blend rule for such a blend. The effect is clear even at low concentrations of the ethylene-based polymer PE2. For example a blend having just 10.0 wt. % PE2 has an MD Tear value that is 26% greater than expected, and well over the 10% estimated likely error in the MD Tear value. The effect is also evident even at low concentrations of the heterogeneously branched components. For example, the expected value for the MD Tear for a blend comprising 10 wt. % PE2 and 90 wt. % ZN1 (Example 2) is 7.97 g/μm. The observed MD Tear Example 2, however, is 10.5 g/μm, 32% greater than that expected by the blend rule for such a blend. Example 2 also surprisingly has Dart Impact higher than that of PE2 alone. In other words, this blend possesses a synergism in Dart Impact properties as well as in MD Tear.

Examples 8-12

Figure 5:
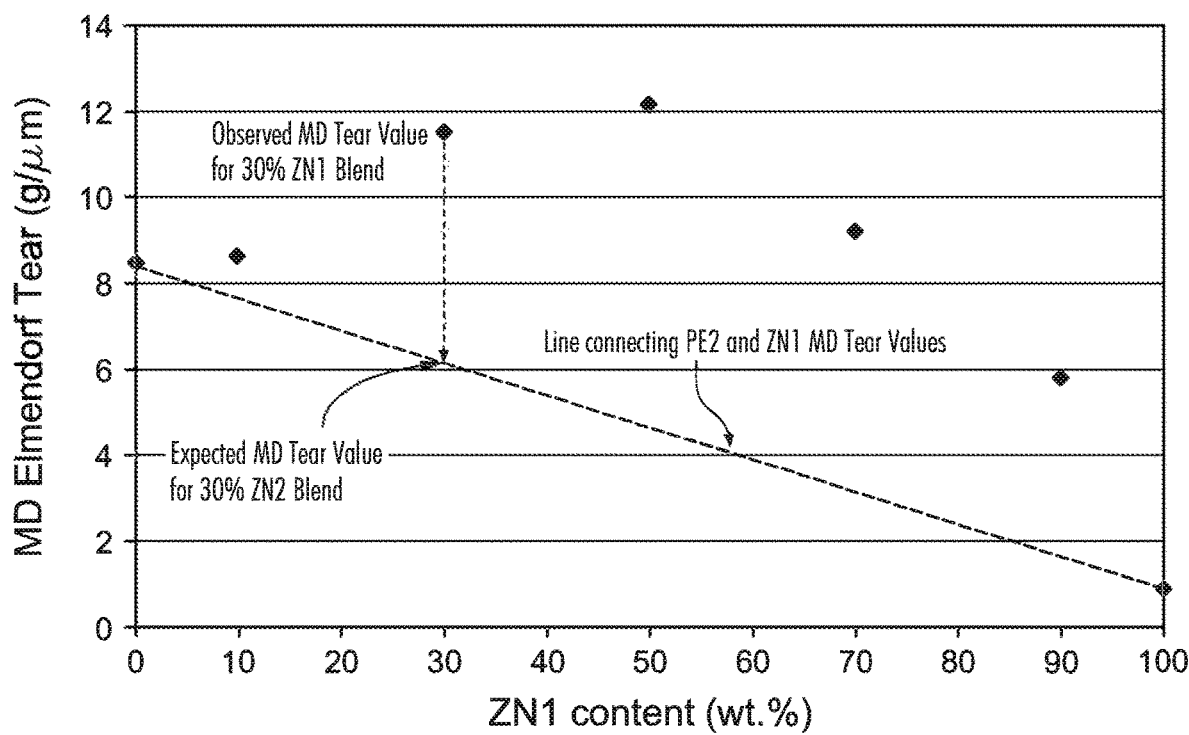

In Examples 8-12, the ethylene-based polymer PE2 is blended with varying amounts of a heterogeneously branch linear copolymer of ethylene and 1-butene prepared by Ziegler-Natta polymerization having a melt index ($I_{2.16}$) of 2.0 g/10 min. and a density of 0.918 g/cm³, available from ExxonMobil Chemical Company as LLDPE 1002YB (referred to as ZN2). Films of these blend compositions are made under substantially the same conditions as those of Examples 1-7. MD Elmendorf Tear and Dart Impact properties of these films are recorded in Table 2. As FIG. 5 illustrates, even small amounts of PE2 blended with ZN2 dramatically improve the MD Tear value compared to that of films having ZN2 alone.

TABLE 2

| Example No. | PE2:ZN2 (wt. %) | MD Elmendorf Tear (g/μm) | Dart A Impact (g/μm) |
|---|---|---|---|
| 8 | 90.0:10.0 | 8.6 | 65.0 |
| 9 | 70.0:30.0 | 11.5 | 68.6 |
| 10 | 50.0:50.0 | 12.1 | 14.6 |
| 11 | 30.0:70.0 | 9.2 | 5.2 |
| 12 | 10.0:90.0 | 5.8 | 3.2 |
| 13† | 0:100 | 0.98 | 2.5 |

†Film (0.80 mil/20.3 μm) is made on a 3.5 in cast film line having a 5 inch melt curtain length a melt temperature of 279° C.

Example 14-19

Figure 6:
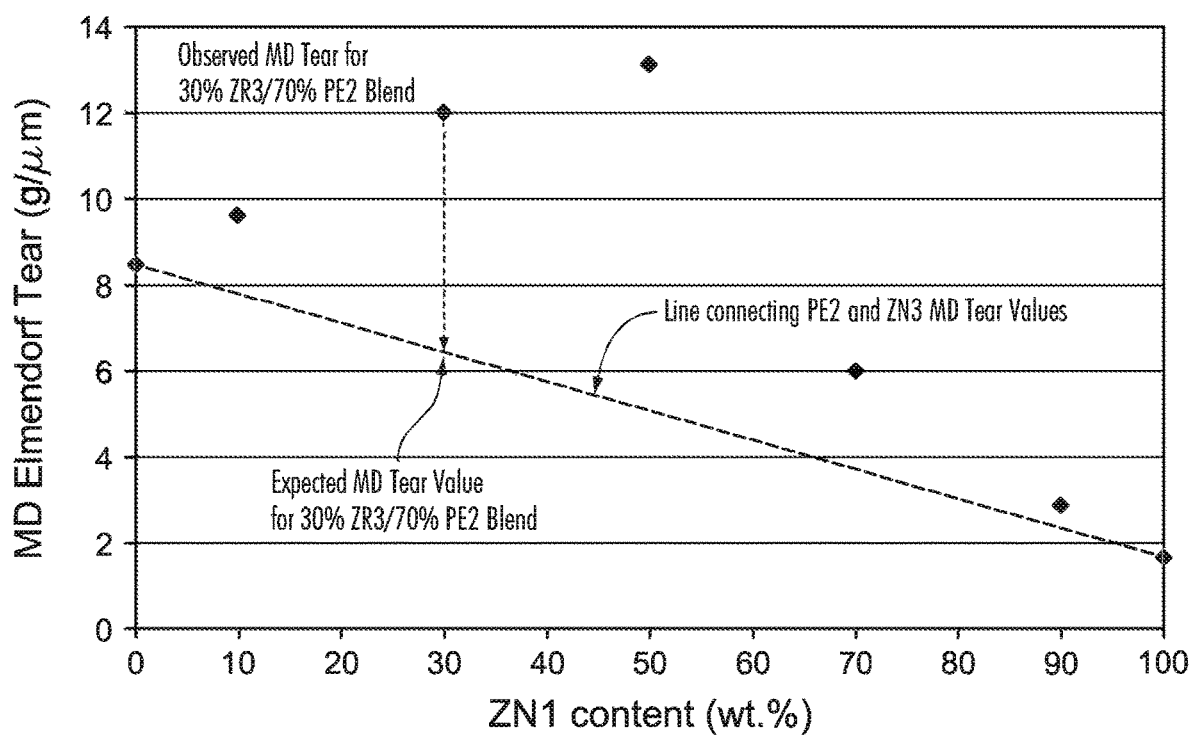

In Examples 14-19, the ethylene-based polymer PE2 is blended with varying amounts of a heterogeneously branch linear copolymer of ethylene and 1-butene prepared by Ziegler-Natta polymerization having a melt index ($I_{1.16}$) of 0.70 g/10 min. and a density of 0.925 g/cm³, available from ExxonMobil Chemical Company as LLDPE 1201XV (referred to as ZN3). Films of these blend compositions are made under substantially the same conditions as those of Examples 1-7. MD Elmendorf Tear and Dart Impact properties of these films are recorded in Table 3. FIG. 6 illustrates the effect on MD Tear of blending PE2 with ZN3.

TABLE 3

| Example No. | PE2:ZN3 (wt. %) | MD Elmendorf Tear (g/μm) | Dart A Impact (g/μm) |
|---|---|---|---|
| 14 | 90.0:10.0 | 9.6 | 76.6 |
| 15 | 70.0:30.0 | 12.0 | 27.1 |
| 16 | 50.0:50.0 | 13.1 | 8.0 |
| 17 | 30.0:70.0 | 6.0 | 4.8 |
| 18 | 10.0:90.0 | 2.9 | 2.9 |
| 19† | 0:100 | 1.7 | 2.3 |

†Film (1.18 mil/30.0 μm) is made on a 2.5 in blown film line having a 6 inch die with a 60 mil die gap at a 2.5:1 blow-up ratio.

Examples 20-26

Figure 7:
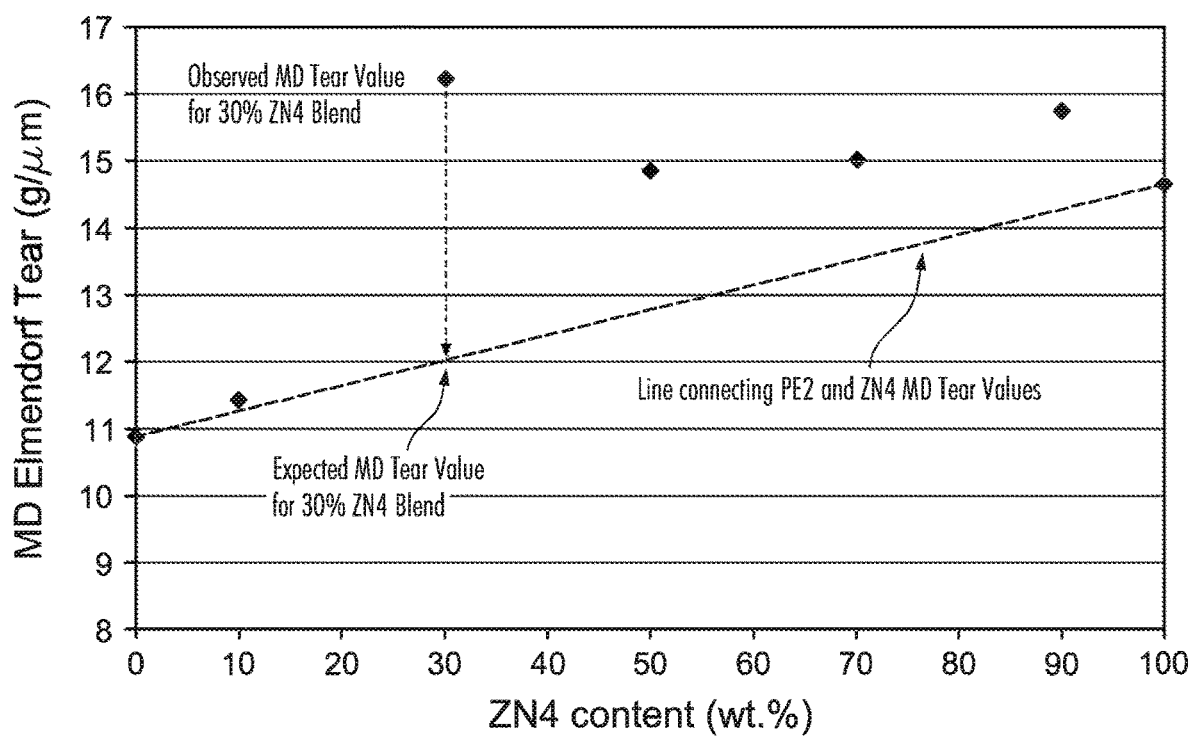

In Examples 20-26, the ethylene-based polymer PE2 is blended with varying amounts of a heterogeneously branch linear copolymer of ethylene and 1-hexene prepared by Ziegler-Natta polymerization having a melt index ($I_{2.16}$) of 1.0 g/10 min. and a density of 0.917 g/cm³, available from ExxonMobil Chemical Company as LLDPE 3001.32 (referred to as ZN4). Films of these blend compositions are made under the conditions set out in Table 1. Resulting selected properties are also recorded in Table 4, As FIG. 7 shows, the synergistic effect of ethylene-based polymer PE2 remains in blends of the ethylene/1-hexene ZN4 copolymer despite the reversal in the values of MD Tear for PE2 relative to ZN4 when compared to that of the I-butene containing copolymers ZN1-ZN3.

ferred to as ZN5). Films of these blend compositions are made under substantially the same conditions as those of Examples 1-7. MD Elmendorf Tear and Dart Impact properties of these films are recorded in Table 5.

Examples 30-31

Figure 8:
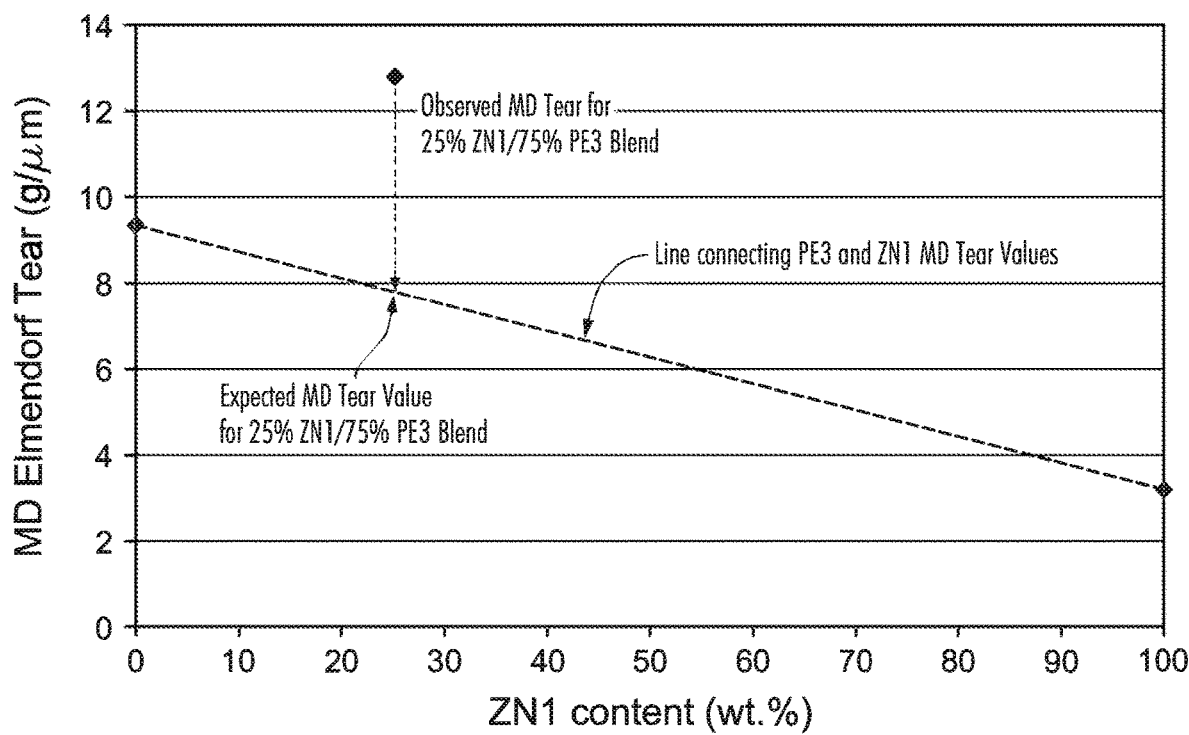

In Examples 30-31, films made from PE3 are compared a blends of PE3 comprising 25.0 wt % ZN1. Properties are reported in Table 5. FIG. 8 shows that, like PE2, the ethylene-based polymer PE3 also has a synergistic effect on the MD Elmendorf Tear value.

TABLE 4

| | Example | | | | | | |
|---|---|---|---|---|---|---|---|
| | 20 | 21 | 22 | 23 | 24 | 25 | 26 |
| PE2 (wt. %) | 100.0 | 90.0 | 70.0 | 50.0 | 30.0 | 10.0 | 0 |
| ZN4 (wt. %) | 0 | 10.0 | 30.0 | 50.0 | 70.0 | 90.0 | 100.0 |
| Die Gap | 60 | 60 | 60 | 60 | 60 | 60 | 60 |
| BUR | 2.5 | 2.5 | 2.5 | 2.5 | 2.5 | 2.5 | 2.5 |
| Horse Power | 20 | 19.7 | 19.1 | 18.9 | 18.5 | 18.1 | 18.1 |
| Extruder Melt Temp (° C.) | 399 | 399 | 398 | 397 | 396 | 396 | 396 |
| Extruder Pressure 1 (PSI) | 3830 | 3790 | 3770 | 3600 | 3520 | 3430 | 3410 |
| Extruder Motor Load (%) | 61.3 | 60.8 | 60.1 | 59.8 | 58.7 | 57.8 | 57.8 |
| Extruder RPM | 61.6 | 61.1 | 60 | 59.6 | 59.4 | 59.1 | 59.1 |
| Line Speed (ft/min) | 168 | 168 | 168 | 168 | 168 | 168 | 168 |
| Extrusion Rate (lb/hr) | 188 | 188 | 189 | 190 | 189 | 188 | 189 |
| Frost Line Height (in.) | 21 | 21 | 21 | 20 | 21 | 21 | 21 |
| Die Factor (lb/hr-in-c) | 10.0 | 10.0 | 10.0 | 10.1 | 10.0 | 10.0 | 10.0 |
| 1% Secant (psi) | | | | | | | |
| MD | 26,482 | 26,243 | 25,882 | 27,428 | 27,874 | 29,206 | 29,150 |
| TD | 34,858 | 34,427 | 33,715 | 33,808 | 34,653 | 35,594 | 37,672 |
| Yield Strength (psi) | | | | | | | |
| MD | 1,287 | 1,310 | 1,343 | 1,315 | 1,328 | 1,407 | 1,357 |
| TD | 1,405 | 1,456 | 1,410 | 1,491 | 1,478 | 1,571 | 1,559 |
| Elongation @ Yield (%) | | | | | | | |
| MD | 6.1 | 6.3 | 6.2 | 6 | 5.9 | 7.2 | 6 |
| TD | 6 | 7.1 | 5.5 | 6.3 | 5.8 | 7.5 | 5.8 |
| Tensile Strength (psi) | | | | | | | |
| MD | 8,803 | 9,170 | 9,131 | 9,046 | 9,256 | 9,010 | 8,680 |
| TD | 8,447 | 8,069 | 7,758 | 7,935 | 7,157 | 7,210 | 7,095 |
| Elongation @ Break (%) | | | | | | | |
| MD | 396 | 403 | 422 | 448 | 479 | 527 | 563 |
| TD | 648 | 657 | 692 | 728 | 748 | 810 | 827 |
| Elmendorf Tear | | | | | | | |
| MD (g) | 281 | 295 | 408 | 387 | 392 | 408 | 367 |
| TD (g) | 395 | 438 | 551 | 634 | 673 | 702 | 733 |
| MD (g/μm) | 10.862 | 11.428 | 16.197 | 14.854 | 15.010 | 15.737 | 14.602 |
| TD (g/μm) | 15.151 | 17.257 | 21.463 | 24.418 | 26.133 | 27.592 | 28.582 |
| Haze (%) | 11.3 | 13.5 | 12 | 12.6 | 15.3 | 14.9 | 13 |
| Dart Drop, Method A (g) | >1312 | ≥1270 | 925 | 430 | 269 | 180 | 161 |
| Dart Drop, Method A (g μm) | >51.65 | ≥50.00 | 36.41 | 16.77 | 10.47 | 7.086 | 6.417 |
| Puncture | | | | | | | |
| Peak Force (lbs) | 10.9 | 11.1 | 10.3 | 10.5 | 10.1 | 9.3 | 8.8 |
| Break Energy (in-lbs) | 33 | 33.6 | 30.5 | 32.4 | 31.5 | 29.1 | 28.2 |
| Avg Gauge (mils) | 1.0 | 1.0 | 1.0 | 1.0 | 1.0 | 1.0 | 0.99 |
| Low | 0.92 | 0.93 | 0.92 | 0.93 | 0.92 | 0.91 | 0.89 |
| High | 1.09 | 1.11 | 1.1 | 1.12 | 1.1 | 1.1 | 1.09 |

Examples 27-29

In Examples 27-29, films made from PE2 are compared to blends of PE2 with varying amounts of a heterogeneously branch linear copolymer of ethylene and I-butene prepared by Ziegler-Natta polymerization having a melt index ($I_{2.16}$) of 1.0 g/10 min. and a density of 0.918 g/cm³, available from ExxonMobil Chemical Company as LLDPE 1001X31 (re- Example 32

Figure 9:
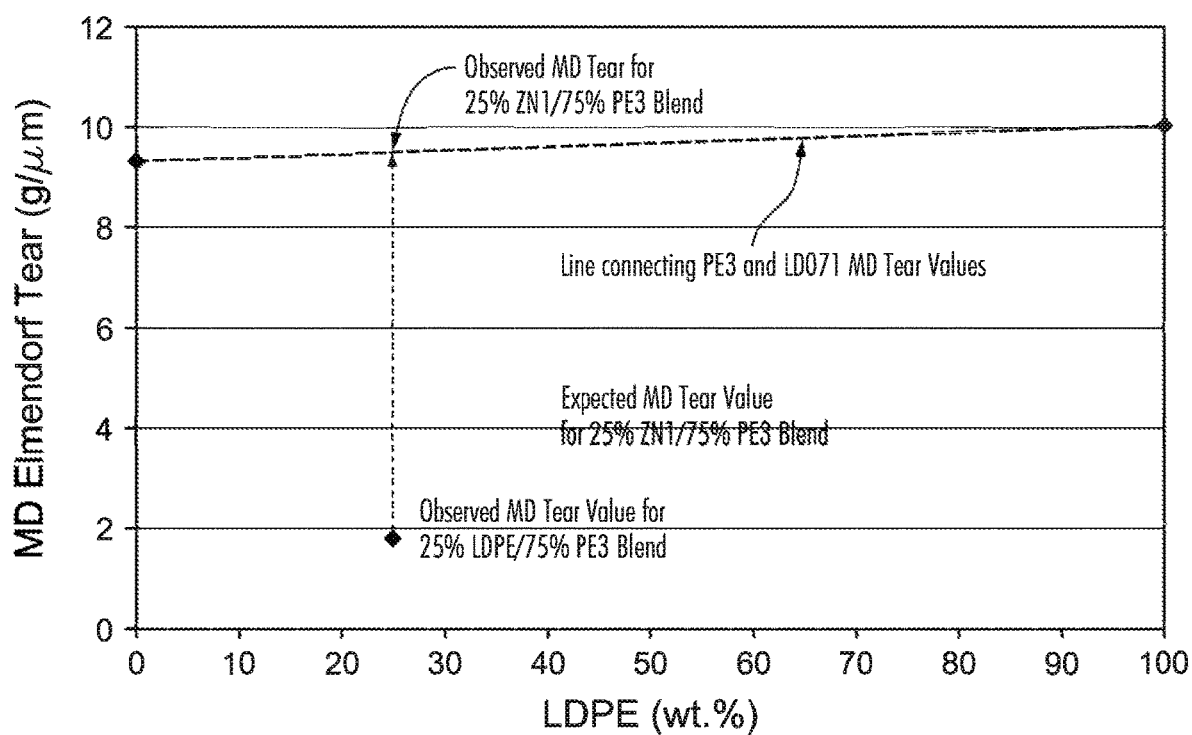

A blend comprising 75.0 wt. % PE3 and 25.0 wt. % of a LDPE formed by high-pressure radical polymerization having a melt index ($I_{2.16}$) of 0.70 g/10 min. and a density of 0.924 g/cm³, available from ExxonMobil Chemical Company as LD071, and of LD071 is prepared. Films of LD071 have a thickness of 2 mil (50.8 μm) on a 2.5 in. (63.5 min)

blown e having a 2.5 inch with a 30 mil (0.76 mm) die gap at a 2.5:1 blow-up ratio at a melt temperature of 200° C. at a rate of 8 lbs/hr/in die circumference (1.43 kg/hr/cm). Films have an MD Elmendorf Tear Value of 510 g (10.04 g/μm) and a Dart Impact of 160 g (3.15 g/μm). Properties of the blend are reported in Table 5. As FIG. 9 shows, the MD Tear of the blend including PE3 and LDPE is less than the MD Tear of both PE3 and LDP alone. In other words, LDPE-containing blends do not show the synergistic effects observed when a heterogeneously branched polymer is combined with an ethylene-based polymer according to the invention.

Example 33

Figure 10:
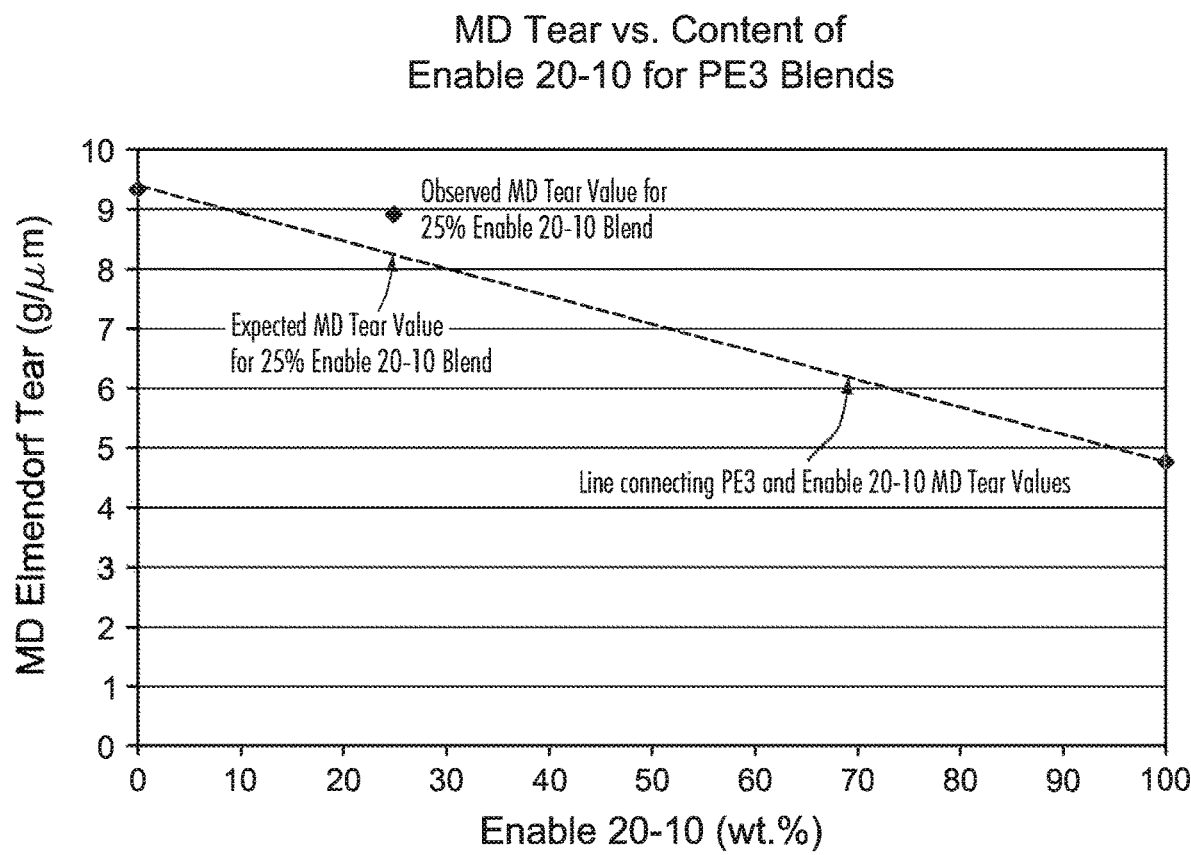

A blend comprising 75.0 wt. % PE3 and 25.0 wt. % of a meta locene catalyzed ethylene-hexene copolymer having a narrow, unimodal comonomer composition distribution having a melt index ($I_{2.16}$) of 1.0 g/10 min. and a density of 0.920 g/cm$^3$, available from ExxonMobil Chemical Company as Enable™ 20-10 mPE resin (mPEI) is prepared. Films of mPEI have a thickness of 1 mil (25.4 μm) on a 2.5 in (63.5 mm) blown film line having a 2.5 inch die with a 30 mil (0.76 mm) die gap at a 2.5:1 blow-up ratio at a melt temperature of 204° C. at a rate of 10 lbs/hr/in die circumference (1.79 kg/hr./cm). Films have an MD Elmendorf Tear Value of 120 g (4.72 g/μm) and a Dart Impact of 170 g (6.69 g/μm). Properties of the blend are reported in Table 5. As FIG. 10 shows, the MD Tear of the blend including PE3 and mPE1 is not significantly improved compared to the expected MD Tear value.

TABLE 5

| | Example | | | | | | |
|---|---|---|---|---|---|---|---|
| | 27 | 28 | 29 | 30 | 31 | 32 | 33 |
| 1st Component (wt. %) | PE2 (100.0) | PE2 (90.0) | PE2 (75.0) | PE3 (100.0) | PE3 (75.0) | PE3 (75.0) | PE3 (75.0) |
| 2nd Component (wt. %) | — | ZN5 (10.0) | ZN5 (25.0) | — | ZN1 (25.0) | LD071 (25.0) | mPE1 (25.0) |
| Die Gap | 60 | 60 | 60 | 60 | 60 | 60 | 60 |
| BUR | 2.5 | 2.5 | 2.5 | 2.5 | 2.5 | 2.5 | 2.5 |
| Horse Power | 20.1 | 18.7 | 19.4 | 16.1 | 15.5 | 14.8 | 16.9 |
| Extruder Melt Temp (° C.) | 401 | 401 | 400 | 399 | 398 | 398 | 399 |
| Extruder Pressure 1 (psi) | 4120 | 4050 | 3980 | 3700 | 3600 | 3510 | 3830 |
| Extruder Motor Load (%) | 57.2 | 52.8 | 54.9 | 45.2 | 38.8 | 40.6 | 45.3 |
| Extruder RPM | 66.5 | 66.8 | 66.8 | 67 | 71.1 | 68.4 | 70.5 |
| Line Speed (ft/min) | 167 | 167 | 167 | 167 | 167 | 167 | 167 |
| Extrusion Rate (lb/hr) | 189 | 189 | 191 | 189 | 184 | 196 | 193 |
| Frost Line Height (in.) | 21 | 19 | 19 | 24 | 18 | 17 | 16 |
| Die Factor (lb/hr-in-c) | 10.0 | 10.0 | 10.1 | 10 | 9.8 | 9.9 | 10.2 |
| 1% Secant (psi) | | | | | | | |
| MD | 25626 | 26118 | 25397 | 25433 | 25829 | 40190 | 26693 |
| TD | 30696 | 31040 | 81214 | 31971 | 30143 | 54733 | 32237 |
| Yield Strength (psi) | | | | | | | |
| MD | | | | 1196 | 1237 | 1934 | 1325 |
| TD | | | | 1417 | 1343 | 1828 | 1399 |
| Elongation @ Yield (%) | | | | | | | |
| MD | | | | 5.6 | 5.7 | 6.2 | 6.5 |
| TD | | | | 7.4 | 6.1 | 5 | 7 |
| Tensile Strength (psi) | | | | | | | |
| MD | | | | 7330 | 9427 | 8587 | 10608 |
| TD | | | | 8355 | 7705 | 6777 | 8442 |
| Elongation @ Break (%) | | | | | | | |
| MD | | | | 397 | 446 | 341 | 402 |
| TD | | | | 664 | 718 | 706 | 699 |
| Elmendorf Tear | | | | | | | |
| MD (g) | 271 | 313 | 361 | 237 | 324 | 45 | 219 |
| TD (g) | 425 | 447 | 497 | 457 | 514 | 772 | 597 |
| MD (g/μm) | 10.75 | 11.97 | 16.65 | 9.33 | 12.76 | 1.8 | 8.89 |
| TD (g/μm) | 16.57 | 17.44 | 18.81 | 17.99 | 20.24 | 30.39 | 23.50 |
| Haze (%) | | | | 15.9 | 11 | 3.2 | 6.3 |
| MD Gloss (GU) | | | 33 | | 50 | 81.5 | 66.7 |
| TD Gloss (GU) | | | 33 | | 53 | 81.5 | 66.9 |
| Dart Drop, Method A (g) | 714 | 696 | 648 | ≥1374 | 609 | 164 | 722 |
| Dart Drop, Method A (g μm) | 27.83 | 23.19 | 24.04 | ≥54.09 | 23.98 | 6.39 | 29.30 |

TABLE 5-continued

| | Example | | | | | | |
|---|---|---|---|---|---|---|---|
| | 27 | 28 | 29 | 30 | 31 | 32 | 33 |
| Puncture | | | | | | | |
| Peak Force (lbs) | | | | 10.1 | 10.16 | 12.98 | 11.28 |
| Break Energy (in-lbs) | | | | 29.62 | 30.76 | 25.93 | 33.26 |
| Avg Gauge (mils) | 1.01 | 1.01 | 1.03 | 1.0 | 1.0 | 1.01 | 0.97 |
| Low | 0.94 | 0.95 | 0.98 | 0.95 | 0.95 | 0.95 | 0.90 |
| High | 1.08 | 1.08 | 1.11 | 1.07 | 1.04 | 1.11 | 1.08 |

Figure 11:
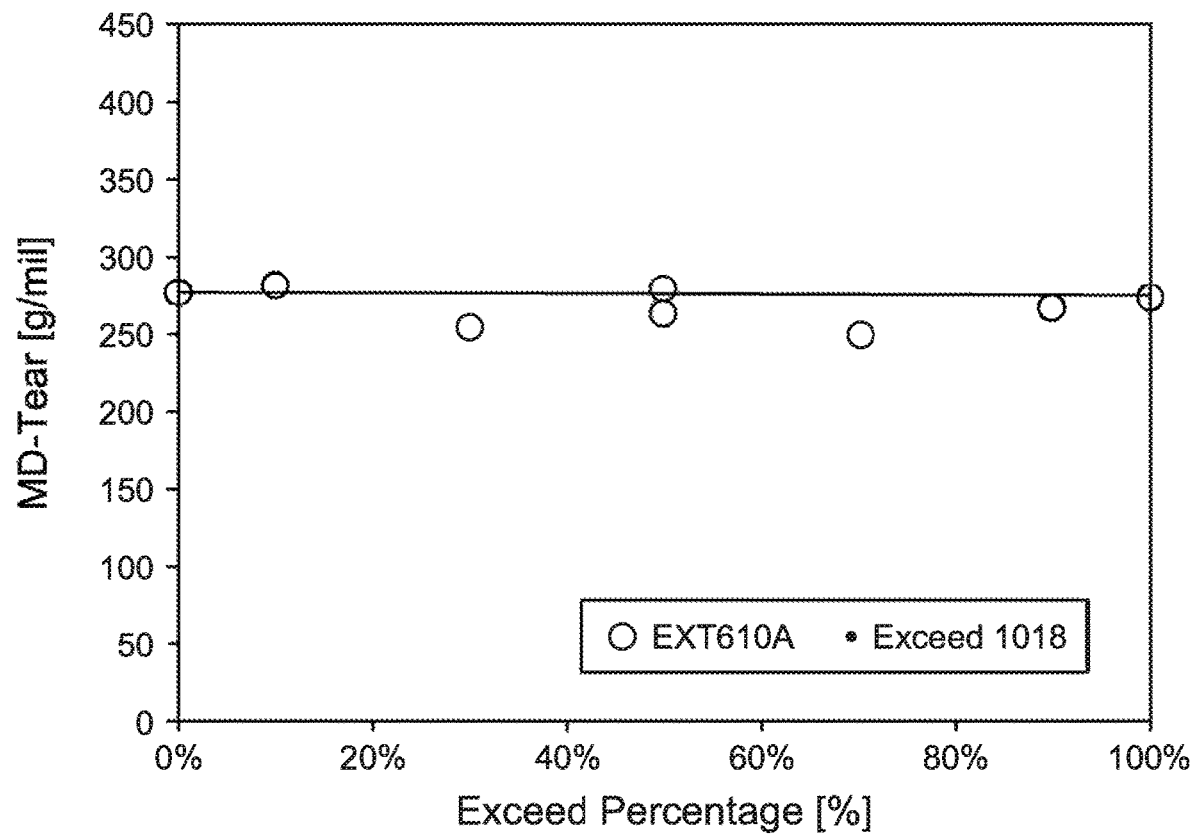

Examples of blends comprising PE2 and a metallocene catalyzed linear low density ethylene-hexene copolymer having a narrow, unimodal comonomer composition distribution having a melt index ($I_{2.16}$) of 1.0 g/10 min. and a density of 0.918 g/cm³, available from ExxonMobil Chemical Company as Exceed™ 1018 mPE resin (mPE2) are prepared. As FIG. 11 shows, these blends do not show a synergistic effect.

The examples herein demonstrate that there is a surprising synergism in the MD Tear performance that is surprisingly particular to blends of a heterogeneously branched ethylene polymer and an ethylene-based polymer. Such a synergism provides not just for surprising MD Tear values, but also the opportunity to develop economically advantageous compositions by combining a relatively cost effective polymer with small amounts of a second polymer.

All documents described herein are incorporated by reference herein, including any priority documents and/or testing procedures to the extent they are not inconsistent with this text, provided, however, that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. A polymer composition comprising:
   (A) 10 wt. % to 50 wt. % of a Ziegler-Natta-catalyzed LLDPE polymer that is heterogeneously branched, has polymer units derived from ethylene and at least one of butene-1, and hexene-1, and has (i) density from 0.917 to 0.926 g/cm³, (ii) melt index from 0.7 g/10 min to 2.0 g/10 min, and (iii) a CDBI<50.0%; and
   (B) 90 wt. % to 50 wt. % of a metallocene-catalyzed LLDPE polymer having:
   i. a melt index of from about 0.6 g/10 min to about 1.0 g/10 min,
   ii. a melt index ratio of from about 15 to about 30,
   iii. a weight average molecular weight (Mw) of from about 20,000 to about 200,000 g/mol,
   iv. a molecular weight distribution (Mw/Mn) of from about 2.0 to about 4.5;
   v. a density of from 0.915 to 0.921 g/cm³,
   vi. a first peak and a second peak in a comonomer distribution analysis, wherein the first peak has a maximum at a log(Mw) value of 4.3 to 4.7 and a TREF elution temperature of 85.0° C. to 95.0° C. and the second peak has a maximum at a log(Mw) value of 5.1 to 5.6 and a TREF elution temperature of 60.0° C. to 70.0° C., and
   vii. a CDBI of 20 to 26%,
   wherein:
   a film made of the polymer composition has an MD Elmendorf Tear value greater than an expected MD Elmendorf Tear value determined from a blend rule for a film made from a blend comprising the Ziegler-Natta-catalyzed LLDPE and the metallocene-catalyzed LLDPE, where the blend rule is defined as:

$$MDTear_x = MDTear^{ZN1}{}_{100} - MDTear^{ZN1}{}_0/100 \text{ wt. }\% - 0 \text{ wt.}\% \text{ wt. }\%^{ZN1}{}_x + MDTear^{ZN1}{}_0$$

wherein $MDTear_x$ is the MD Elmendorf Tear value for a film having x wt % of the Ziegler-Natta-catalyzed LLDPE; wt. $\%_x^{zN1}$ is the weight percent of the Ziegler-Natta-catalyzed LLDPE in the blend; and further provided that wt % of the Ziegler-Natta-catalyzed LLDPE and wt % of the metallocene-catalyzed LLDPE add to 100 wt %.

2. The polymer composition of claim 1, wherein the polymer composition comprises 15.0 to 50.0 wt. % of the Ziegler-Natta-catalyzed LLDPE polymer.

3. The polymer composition of claim 1, wherein the Ziegler-Natta-catalyzed LLDPE polymer comprises 2.0 to 20.0 mole % polymer units derived from the at least one of butene-1, and hexene-1.

4. The polymer composition of claim 1, wherein the polymer composition comprises (A) 15 wt. % to 45 wt. % of the Ziegler-Natta-catalyzed LLDPE and (B) 55 wt. % to 85 wt. % of the metallocene-catalyzed LLDPE polymer.

5. The polymer composition of claim 1, wherein the first peak has a maximum at a log(Mw) value of 4.5 to 4.7 and a TREF elution temperature of 85.0° C. to 90.0° C.

6. The polymer composition of claim 1, wherein the film of the polymer composition has a MD Elmendorf Tear value that is at least 2.0% greater than the expected MD Elmendorf Tear value determined from the blend rule for the film made from the blend comprising the Ziegler-Natta-catalyzed LLDPE and the metallocene-catalyzed LLDPE.

7. The polymer composition of claim 1, wherein the polymer composition comprises 10 to 45 wt. % of the Ziegler-Natta-catalyzed LLDPE polymer and 90 wt % to 55 wt % of the metallocene-catalyzed LLDPE.

8. The polymer composition of claim 1, wherein the metallocene-catalyzed LLDPE polymer has a SDBI of 18° C. to 22° C.

9. The polymer composition of claim 1, wherein the metallocene-catalyzed LLDPE polymer contains 0.01 ppm to 2 ppm of hafnium.

10. The polymer composition of claim 1, wherein the metallocene-catalyzed LLDPE polymer has a SDBI of 18° C. to 22° C., and contains 0.01 ppm to 2 ppm of hafnium.

11. A polymer film comprising at least one layer made from a polymer composition comprising:
(A) 10 wt. % to 50 wt. % of a Ziegler-Natta-catalyzed LLDPE polymer that is heterogeneously branched, has polymer units derived from at least one of butene-1, and hexene-1, and has (i) density from 0.917 to 0.926 g/cm$^3$, (ii) melt index from 0.7 g/10 min to 2.0 g/10 min, and (iii) a CDBI of less than 50.0%; and
(B) 90 wt. % to 50 wt. % of a metallocene-catalyzed LLDPE polymer having at least a first peak and a second peak in a comonomer distribution analysis, wherein the first peak has a maximum at a log(Mw) value of 4.3 to 4.7 and a TREF elution temperature of 85.0° C. to 95.0° C. and the second peak has a maximum at a log(Mw) value of 5.1 to 5.6 and a TREF elution temperature of 60.0° C. to 70.0° C., and the metallocene-catalyzed LLDPE polymer further having:
i. a melt index of from about 0.6 g/10 min to about 1.0 g/10 min,
ii. a melt index ratio of from about 15 to about 30,
iii. a weight average molecular weight (Mw) of from about 20,000 to about 200,000 g/mol,
iv. a molecular weight distribution (Mw/Mn) of from about 2.0 to about 4.5,
v. a density of from 0.915 to 0.921 g/cm$^3$, and
vi. a CDBI of 20 to 26%,
the film has an MD Elmendorf Tear value greater than an expected MD Elmendorf Tear value determined from a blend rule for a film made from a blend comprising the Ziegler-Natta-catalyzed LLDPE and the metallocene-catalyzed LLDPE, where the blend rule is defined as:

$$MDTear_x = \frac{MDTear_{100}^{ZN1} - MDTear_0^{ZN1}}{100 \text{ wt. \%} - 0 \text{ wt. \%}} \text{ wt. } \%_x^{ZN1} + MDTear_0^{ZN1}$$

wherein $MDTear_x$ is the MD Elmendorf Tear value for a film having x wt % of the Ziegler-Natta-catalyzed LLDPE; wt. $\%_x^{ZN1}$ is the weight percent of the Ziegler-Natta-catalyzed LLDPE in the blend; and further provided that wt % of the Ziegler-Natta-catalyzed LLDPE and wt % of the metallocene-catalyzed LLDPE add to 100 wt %.

12. The polymer film of claim 11, wherein the Ziegler-Natta-catalyzed LLDPE polymer comprises 2.0 to 20.0 mole % polymer units derived from the at least one of butene-1 and hexene-1.

13. The polymer film of claim 11, wherein the first peak has a maximum at a log(Mw) value of 4.5 to 4.7 and a TREF elution temperature of 85.0° C. to 90.0° C.

14. The polymer film of claim 11, wherein the film has a MD Elmendorf Tear value that is at least 2.0% greater than the expected MD Elmendorf Tear value determined from the blend rule for the film made from the blend comprising the Ziegler-Nana-catalyzed LLDPE and the metallocene-catalyzed LLDPE.

15. The polymer film of claim 11, wherein the film has a Dart A Impact of 200.0 to 1400.0 g/mil.

16. The polymer film of claim 11, wherein the polymer composition comprises 10 to 45 wt. % of the Ziegler-Natta-catalyzed LLDPE polymer and 90 wt % to 55 wt % of the metallocene-catalyzed LLDPE.

17. A polymer composition comprising:
(A) 10 wt. % to 50 wt. % of a Ziegler-Natta-catalyzed LLDPE polymer that is heterogeneously branched, has polymer units derived from ethylene and butene-1, and has (i) density from 0.917 to 0.926 g/cm$^3$, (ii) melt index from 0.7 g/10 min to 2.0 g/10 min, and (iii) a CDBI less than 50.0%; and
(B) wt. % 90 to 50 wt. % of a metallocene-catalyzed LLDPE polymer having:
i. a melt index of from about 0.6 g/10 min to about 1.0 g/10 min,
ii. a melt index ratio of from about 15 to about 30,
iii. a weight average molecular weight (Mw) of from about 20,000 to about 200,000 g/mol,
iv. a molecular weight distribution (Mw/Mn) of from about 2.0 to about 4.5,
v. a density of from 0.915 to 0.921 g/cm$^3$,
vi. at least a first peak and a second peak in a comonomer distribution analysis, wherein the first peak has a maximum at a log(Mw) value of 4.3 to 4.7 and a TREF elution temperature of 85.0° C. to 95.0° C. and the second peak has a maximum at a log(Mw) value of 5.1 to 5.6 and a TREF elution temperature of 60.0° C. to 70.0° C., and
vii. a CDBI of 20 to 26%,
wherein a film of the polymer composition has an MD Elmendorf Tear value greater than an expected MD Elmendorf Tear value determined from a blend rule for a film made from a blend comprising the Ziegler-Natta-catalyzed LLDPE and the metallocene-catalyzed LLDPE, where the blend rule is defined as:

$$MDTear_x = \frac{MDTear_{100}^{ZN1} - MDTear_0^{ZN1}}{100 \text{ wt. \%} - 0 \text{ wt. \%}} \text{ wt. } \%_x^{ZN1} + MDTear_0^{ZN1}$$

wherein $MDTear_x$ is the MD Elmendorf Tear value for a film having x wt % of the Ziegler-Natta-catalyzed LLDPE; wt. $\%_x^{zN1}$ is the weight percent of the Ziegler-Natta-catalyzed LLDPE in the blend; and further provided that wt % of the Ziegler-Natta-catalyzed LLDPE and wt % of the metallocene-catalyzed LLDPE add to 100 wt %.

18. The polymer composition of claim 17, wherein the Ziegler-Natta-catalyzed LLDPE polymer (A) is present at 10 to 30 wt. % and the metallocene-catalyzed LLDPE polymer (B) is present at 90 to 70 wt. %.

19. The polymer composition of claim 17, wherein the Ziegler-Natta-catalyzed LLDPE polymer comprises 2.0 to 20.0 mole % of the polymer units derived from butene-1.

20. The polymer composition of claim 17, wherein the first peak has a maximum at a log(Mw) value of 4.5 to 4.7 and a TREF elution temperature of 85.0° C.

21. The polymer composition of claim 17, wherein the film of the composition has a MD Elmendorf Tear value that is at least 2.0% greater than the expected value of the MD Elmendorf Tear value determined from the blend rule for the film made from the blend comprising the Ziegler-Natta-catalyzed LLDPE and the metallocene-catalyzed LLDPE.

22. The polymer composition of claim 17, wherein the polymer composition comprises 10 to 45 wt. % of the Ziegler-Natta-catalyzed LLDPE polymer and 90 wt % to 55 wt % of the metallocene-catalyzed LLDPE.

23. A polymer film comprising at least one layer made from a polymer composition, comprising:
   (A) 10 wt. % to 50 wt. % of a Ziegler-Natta-catalyzed LLDPE polymer that is heterogeneously branched, has polymer units derived from ethylene and butene-1, and has (i) density from 0.917 to 0.926 g/cm$^3$, (ii) melt index from 0.7 g/10 to 2.0 g/10 min, and (iii) a CDBI of less than 50.0%; and
   (B) 90 wt. % to 50 wt. % of a metallocene-catalyzed LLDPE polymer having at least a first peak and a second peak in a comonomer distribution analysis, wherein the first peak has a maximum at a log(Mw) value of 4.3 to 4.7 and a TREF elution temperature of 85.0° C. to 95.0° C. and the second peak has a maximum at a log(Mw) value of 5.1 to 5.6 and a TREF elution temperature of 60.0° C. to 70.0° C., and the metallocene-catalyzed LLDPE polymer further having:
      i. a melt index of from about 0.6 g/10 min to about 1.0 g/10 min,
      ii. a melt index ratio of from about 15 to about 30,
      iii. a weight average molecular weight (Mw) of from about 20,000 to about 200,000 g/mol,
      iv. a molecular weight distribution (Mw/Mn) of from about 2.0 to about 4.5,
      v. a density of from 0.915 to 0.921 g/cm$^3$, and
      vi. a CDBI of 20-26%
   wherein the has an MD Elmendorf Tear value greater than an expected MD Elmendorf Tear value determined from a blend rule for a film made from a blend comprising the Ziegler-Natta-catalyzed LLDPE and the metallocene-catalyzed LLDPE, where the blend rule is defined as:

$$MDTear_x = \frac{MDTear_{100}^{ZN1} - MDTear_0^{ZN1}}{100 \text{ wt. \%} - 0 \text{ wt. \%}} \text{ wt. \%}_x^{ZN1} + MDTear_0^{ZN1}$$

wherein $MDTear_x$ is the MD Elmendorf Tear value for a film having x wt % of the Ziegler-Natta-catalyzed LLDPE; wt. %$_x^{ZN1}$ is the weight percent of the Ziegler-Natta-catalyzed LLDPE in the blend; and further provided that wt % of the Ziegler-Natta-catalyzed LLDPE and wt % of the metallocene-catalyzed LLDPE add to 100 wt %.

24. The polymer film of claim 23, wherein the Ziegler-Natta-catalyzed LLDPE polymer comprises 2.0 to 20.0 mol % of the polymer units derived from butene-1.

25. The polymer film of claim 23, wherein the polymer composition comprises (A) 15 wt. % to 45 wt. % of the Ziegler-Natta-catalyzed LLDPE and (B) 55 wt. % to 85 wt. % of the metallocene-catalyzed LLDPE polymer.

26. The polymer film of claim 23, wherein the first peak has a maximum at a log(Mw) value of 4.5 to 4.7 and a TREF elution temperature of 85.0° C. to 90.0° C.

27. The polymer film of claim 23, wherein the film has a MD
   Elmendorf Tear value that is at least 2.0% greater than the expected MD Elmendorf Tear value determined from the blend rule for the film made from the blend comprising the Ziegler-Nana-catalyzed LLDPE and the metallocene-catalyzed LLDPE.

28. The polymer film of claim 23, wherein the polymer composition comprises 10 to 45 wt. % of the Ziegler-Natta-catalyzed LLDPE polymer and 90 wt % to 55 wt % of the metallocene-catalyzed LLDPE.

* * * * *